(12) United States Patent
Wang et al.

(10) Patent No.: US 12,386,841 B2
(45) Date of Patent: Aug. 12, 2025

(54) DATA PROCESSING METHOD AND ELECTRONIC DEVICE

(71) Applicant: NEC CORPORATION, Tokyo (JP)

(72) Inventors: Erli Wang, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/458,291

(22) Filed: Aug. 30, 2023

(65) Prior Publication Data

US 2024/0070160 A1    Feb. 29, 2024

(30) Foreign Application Priority Data

Aug. 31, 2022   (CN) .......................... 202211057861.4

(51) Int. Cl.
  *G06F 16/20*     (2019.01)
  *G06F 16/2457*   (2019.01)
  *G06F 16/2458*   (2019.01)

(52) U.S. Cl.
  CPC .... *G06F 16/24578* (2019.01); *G06F 16/2462* (2019.01)

(58) Field of Classification Search
  CPC .................. G06F 16/24578; G06F 16/2462
  See application file for complete search history.

(56) References Cited

U.S. PATENT DOCUMENTS

2020/0293909 A1 *  9/2020  Mizoguchi .......... G06F 16/9035
2020/0342262 A1 * 10/2020  Feng .................... G06F 18/214

FOREIGN PATENT DOCUMENTS

WO    WO-2020243965 A1 * 12/2020 ............. G06N 20/00

* cited by examiner

Primary Examiner — Kristopher Andersen
(74) Attorney, Agent, or Firm — Sughrue Mion, PLLC

(57) ABSTRACT

Embodiments of the present disclosure provide a data processing method and an electronic device, which relate to the computer field. The method includes: acquiring a time-series dataset, the time-series dataset comprising multiple time-series data items each comprising a time and multiple attribute parameters corresponding thereto; acquiring a target attribute parameter being at least one of the multiple attribute parameters; determining, based on a time-series model, at least one influence factor of the target attribute parameter, the at least one influence factor indicating at least one attribute parameter influencing the target attribute parameter and at least one time corresponding to the at least one attribute parameter; and outputting the at least one influence factor. As such, according to the embodiments of the present disclosure, for a target attribute parameter, at least one influence factor can be determined based on a time-series dataset and a time-series model. Therefore, an accurate reference can be provided for a decision on the target attribute parameter, and the decision made in this way is more accurate.

18 Claims, 19 Drawing Sheets

| time → | meaning | result |
|---|---|---|
| a  b | => a and b are not overlapped | $a < b$ |
| a / b | => a and b are overlapped, and the right end of b is after the right end of a | $a \lesssim b$ |
| a / b | => a covers b | $a \approx b$ |
| a / b | => a and b are overlapped, and the right end of a is after a right end of b | $a \gtrsim b$ |
| a / b | => b covers a | $a \approx b$ |
| b  a | => a and b are not overlapped | $a > b$ |

Fig. 8A

| examples | result | the first two (top2) |
|---|---|---|
| a/b/c | $a \lesssim b \lesssim c,$ $a < c$ | 1st: a 2nd: b |
| a, b/c | $a < b \approx c$ | 1st: a 2nd: b=c |
| a/b, c | $c < a \lesssim b$ | 1st: c 2nd: a |

Fig. 8B

DATA PROCESSING METHOD AND ELECTRONIC DEVICE

CROSS-REFERENCES TO RELATED APPLICATIONS

This application claims priority to CN Application No. 202211057861.4, entitled automatically and efficiently DATA PROCESSING METHOD AND ELECTRONIC DEVICE, and filed on Aug. 31, 2022, the entire contents of that application being incorporated herein by reference in its entirety.

FIELD

Embodiments of the present disclosure generally relate to the field of computers, and more specifically, to a data processing method, an electronic device, a computer readable storage medium, and a computer product.

BACKGROUND

With the development of technologies, causal analysis has a wide application in a variety of fields such as retail, energy control, abnormal event intervention, and the like. A related decision can be made by utilizing the causal analysis. Nevertheless, in the existing solution, factors such as an event cause and the like, are typically set manually. On one hand, this incurs high labor costs; on the other hand, such manual setting method is not reliable and prone to errors; which makes it impossible to obtain an optimal decision.

SUMMARY

According to example embodiments of the present disclosure, there is provided a data processing solution to obtain at least one influence factor influencing a target attribute parameter.

In a first aspect of the present disclosure, there is provided a data processing method, comprising: acquiring a time-series dataset, the time-series dataset comprising a plurality of time-series data items each comprising a time and a plurality of attribute parameters corresponding thereto; acquiring a target attribute parameter being at least one of the plurality of attribute parameters; determining, based on a time-series model, at least one influence factor of the target attribute parameter, the at least one influence factor indicating at least one attribute parameter influencing the target attribute parameter and at least one time corresponding to the at least one attribute parameter; and outputting the at least one influence factor.

In a second aspect of the present disclosure, there is provided a data processing method, comprising: acquiring a time-series dataset about sales records, the time-series dataset comprising a plurality of time-series data items each comprising a time and a plurality of attribute parameters corresponding thereto, the plurality of attribute parameters comprising at least one of: a purchase price, a sales price, a sales volume, inventory, or client views; determining, based on a time-series model, at least one influence factor of the inventory, the at least influence factor indicating at least one attribute parameter influencing the inventory and at least one time corresponding to the at least one attribute parameter; and determining, based on the at least one influence factor, inventory at a next time.

In a third aspect of the present disclosure, there is provided a data processing method, comprising: acquiring a time-series dataset about electricity of an Internet of Things device, the time-series dataset comprising a plurality of time-series data items each comprising a time and a plurality of attribute parameters corresponding thereto, the plurality attribute parameters comprising at least one of: an electricity price, a power demand, a voltage, a current, a temperature, a humidity, an air pressure, or a power consumption of the Internet of Things device; determining, based on a time-series model, at least one influence factor of the power consumption, the at least one influence factor indicating at least one attribute parameter influencing the power consumption and at least one time corresponding to the at least attribute parameter; and determining, based on the at least one influence factor, a running time of the Internet of Things device.

In a fourth aspect of the present disclosure, there is provided a data processing method, comprising: acquiring a time-series dataset collected from a social network, the time-series dataset comprising a plurality of time-series data items each comprising a time and a plurality of attribute parameters corresponding thereto, the plurality of attribute parameters comprising at least one of: a user identifier, a user post, views of the user post, comments of the user post, or an abnormal indication; determining, based on a time-series model, at least on influence factor of the abnormal indication indicating at least one attribute parameter influencing the target attribute parameter and at least one time corresponding to the at least one attribute parameter; and outputting, based on the at least one influence factor, reminder information indicating a user having an abnormal risk.

In a fifth aspect of the present disclosure, there is provided an electronic device, comprising: at least one processing unit; at least one memory coupled to the at least one processing unit and storing instructions executed by the at least one processing unit, where the instructions, when executed by the at least one processing unit, cause the electronic device to execute the method according to any of the first through fourth aspects of the present disclosure.

In a sixth aspect of the present disclosure, there is provided an electronic device, comprising: a memory and a processor; where the memory is configured to store one or more computer instructions that are executed by the processor to implement the method according to any of the first through fourth aspects of the present disclosure.

In a seventh aspect of the present disclosure, there is provided a computer readable storage medium having a machine executable instruction stored thereon, where the machine executable instruction, when executed by a device, causes the device to implement the method according to any of the first through fourth aspects of the present disclosure.

In an eighth aspect of the present disclosure, there is provided a computer program product comprising a computer executable instruction, where the computer executable instruction, when executed by a processor, implements the method according to any of the first through fourth aspects of the present disclosure.

In a ninth aspect of the present disclosure, there is an electronic device comprising processing circuit means configured to execute the method according to any of the first through fourth aspects of the present disclosure.

The Summary is to introduce a selection of concepts in a simplified form that are further described below in the Detailed Description. This Summary is not intended to identify key features or essential features of the subject matter as described herein, nor is it intended to be used to limit the scope of the present disclosure. Through the following description, other features of the present disclosure will become more apparent.

BRIEF DESCRIPTION OF THE DRAWINGS

The above and other features, advantages, and aspects of the present disclosure will become more apparent, through the following detailed description with reference to the accompanying drawings. Throughout the drawings, the same or similar reference symbols refer to the same or similar elements, wherein:

FIG. 8A illustrates a schematic diagram of determining a relationship between any two numerical intervals a and b according to some embodiments of the present disclosure;

FIG. 8B illustrates a schematic diagram of determining two numerical intervals based on ranking three intervals a, b, and c according to some embodiments of the present disclosure;

DETAILED DESCRIPTION OF EMBODIMENTS

Figure 1:
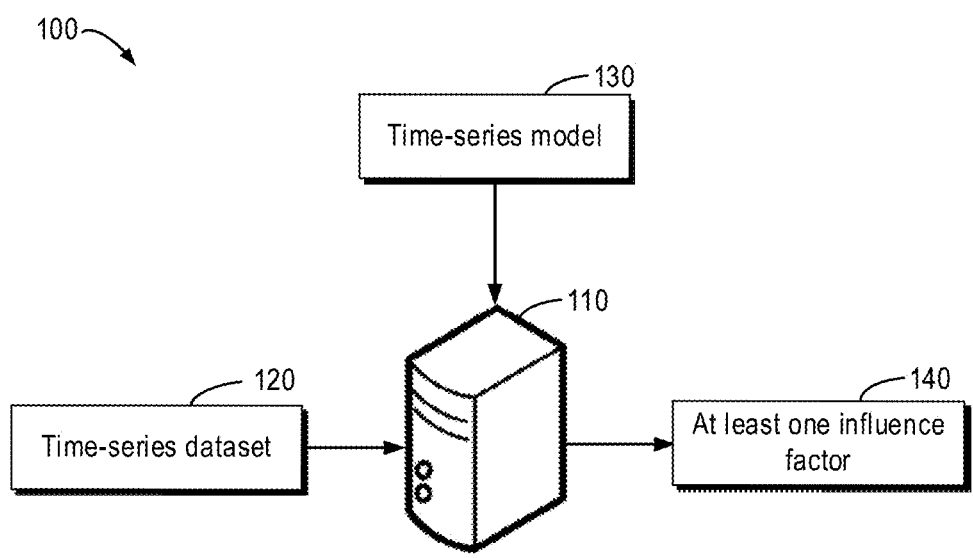
FIG. 1 illustrates a block diagram of an example environment according to embodiments of the present disclosure.

Reference will now be made to drawings to describe in detail the embodiments of the present disclosure. However, it would be appreciated that the present disclosure could be implemented in various forms, which should not be construed as limiting the embodiments as described here. Rather, those embodiments are provided for understanding the present application thoroughly and completely. It would also be appreciated that the drawings and the embodiments of the present disclosure are provided only as an example, rather than suggesting limitation to the protection scope of the present disclosure.

As used herein, the term "includes" and its variants are to be read as open terms that mean "includes, but is not limited to." The term "based on" is to be read as "based at least in part on." The term "an embodiment" or "the embodiment" is to be read as "at least one embodiment." The terms "first," "second," and the like may refer to different objects or the same object. Other explicit or implicit meanings may be included hereinafter.

The respective methods and processes described in the embodiments of the present disclosure may be applied to various electronic devices, such as terminal devices, network devices and the like. The embodiments of the present disclosure may also be implemented in a test device, for example, a signal generator, a signal analyzer, a spectrum analyzer, a network analyzer, a test terminal device, a test network device, a channel emulator, and the like.

In the description about the embodiments of the present disclosure, the term "circuit" may refer to a hardware circuit and/or a combination of a hardware circuit and software. For example, the circuit may be a combination of an analog and/or digital hardware circuit and software/firmware. For another example, the circuit may be any part of a hardware processor having software, including a digital signal processor/digital signal processors, software and memory/memories, where the digital signal processor/digital signal processors, software and memory/memories operate together to cause a device, such as a computing device, or the like, to operate, so as to perform various functions. In a further example, circuit may be a hardware circuit and/or a processor, such as a microprocessor or a part thereof, which requires software/firmware to operate, or where software may not be included if it can operate without software. As used herein, the term "circuit" also covers an implementation having a hardware circuit only, or processor/possessors, or a hardware circuit, or a part of the processor/processors, and subsidiary software and/or firmware thereof.

As to various problems in many fields, intelligent entities need to make a series of decisions. Despite the ease of access to abundant dataset, it still remains difficult to make an accurate decision. For example, choosing which dataset to collect, determining the sufficient predictable pattern, and computing the relative importance of variables are typically carried out manually and separately by, for example, data scientists and practitioners in various fields. As such, this is heavily dependent on labor work when a decision is to be made, leading to a low efficiency on one hand and an inaccurate decision on the other hand.

In view of the above, embodiments of the present disclosure provide a data processing solution, to solve the above-mentioned problem and/or one or more of other potential problems. In the solution, a time-series model may be leveraged to determine at least one influence factor influencing a target attribute parameter. Therefore, manual specifying may be skipped, and the processing efficiency can be improved accordingly. In addition, the influence factor determined through the time-series model may be used to make a more accurate decision in the future.

FIG. 1 illustrates a block diagram of an example environment 100 according to embodiments of the present disclosure. It would be appreciated that the environment 100 as shown therein is merely an example where embodiments of the present disclosure can be implemented, without suggesting limitations to the scope of the present disclosure. The embodiments of the present disclosure can also be applied to other systems or architecture.

As shown in FIG. 1, the environment 100 may include a computing device 110. The computing device 110 may be any device having a computing capability. The computing device 110 may include, but are not limited to: a personal computer, a server computer, a handheld or laptop device, a mobile device (e.g., a mobile phone, a personal digital assistant (PDA), a media player or the like), a wearable device, a consumer electronic product, a small-scale computer, a large-scale computer, a distributed computing system, a cloud computing resource and the like. It would be appreciated that, based on the consideration of costs or the like, the computing device 110 may or may not have sufficient computing resources for model training.

The computing device 110 may be configured to acquire a time-series dataset 120, and output at least one influence factor 140. Determining at least one influence factor 140 may be implemented by a time-series model 130.

Exemplarily, the time-series dataset 120 may be input by a user, or may be acquired from a storage device, which is not limited in the present disclosure. In some embodiments, the time-series dataset 120 may include multiple time-series data items, each of which may include a time and multiple attribute parameters corresponding thereto. Alternatively, different data items have different times. Alternatively, in some examples, multiple attribute parameters may also be referred to as multiple parameters, multiple variables, or others, which is not limited here.

In some examples, the embodiments of the present disclosure can be applied in the retailing field, e.g., may be used to forecast retail demands. Exemplarily, each data item in the time-series dataset 120 may include a time and multiple attribute parameters corresponding thereto, where the attribute parameter may be one or more of: a purchase price, a sales price, a sales volume, inventory, client views, or the like.

In some examples, the embodiments of the present disclosure can be applied to the energy field, e.g., may be used for a control of a quantity of electricity of an Internet of Things (IoT) device. Exemplarily, each data item in the time-series dataset 120 may include a time and multiple attribute parameters corresponding thereto, where the attribute parameter may be one or more of: an electricity price, an electricity demand, a voltage, a current, a temperature, a humidity, an air pressure, or a power consumption of the IoT device.

In some example, the embodiments of the present application can be used for abnormal event intervention, e.g., may be used to predict an abnormal event, such as suicide, or the like, based on information on the social media. Exemplarily, each data item in the time-series dataset 120 may include a time and multiple attribute parameters corresponding thereto, where the attribute parameter may be one or more of: a user identifier, a user post, views of the user post, comments of the user post, or an abnormal indication.

It would be appreciated that the scenarios listed above are provided only for illustration, without suggesting any limitation to the scope of the present disclosure. The embodiments of the present disclosure may be applied to various fields having similar problems, which are not listed herein. In addition, the "action" used in embodiments of the present disclosure may also be referred to as, for example, "decision" or the like, which is not limited in the present disclosure.

It is to be understood that a time series may be used to represent time-spatial process data in the real world. Upon decision-making, prediction may be performed using a correlation over a specific time length, and determining "a specific time length" as minimum sufficient statistics therefore can improve the decision in accuracy. The minimum sufficient statistics may be read as follows: correlations less than the specific time length are insufficient to predict, while correlations exceeding the specific time length may be contaminated with noise and have redundant information retained therein.

In some example, the correlation between different times in a time series may be represented in a graph (e.g., a causal graph), and a node therein denotes a certain attribute parameter at a certain time. A direction from a node to a further node implies a cause relation between the two nodes, and the linear relationship can be depicted by augmenting the quantitative relation of the edge. Reference will be made to FIGS. 2-17 to provide more details.

Figure 2:
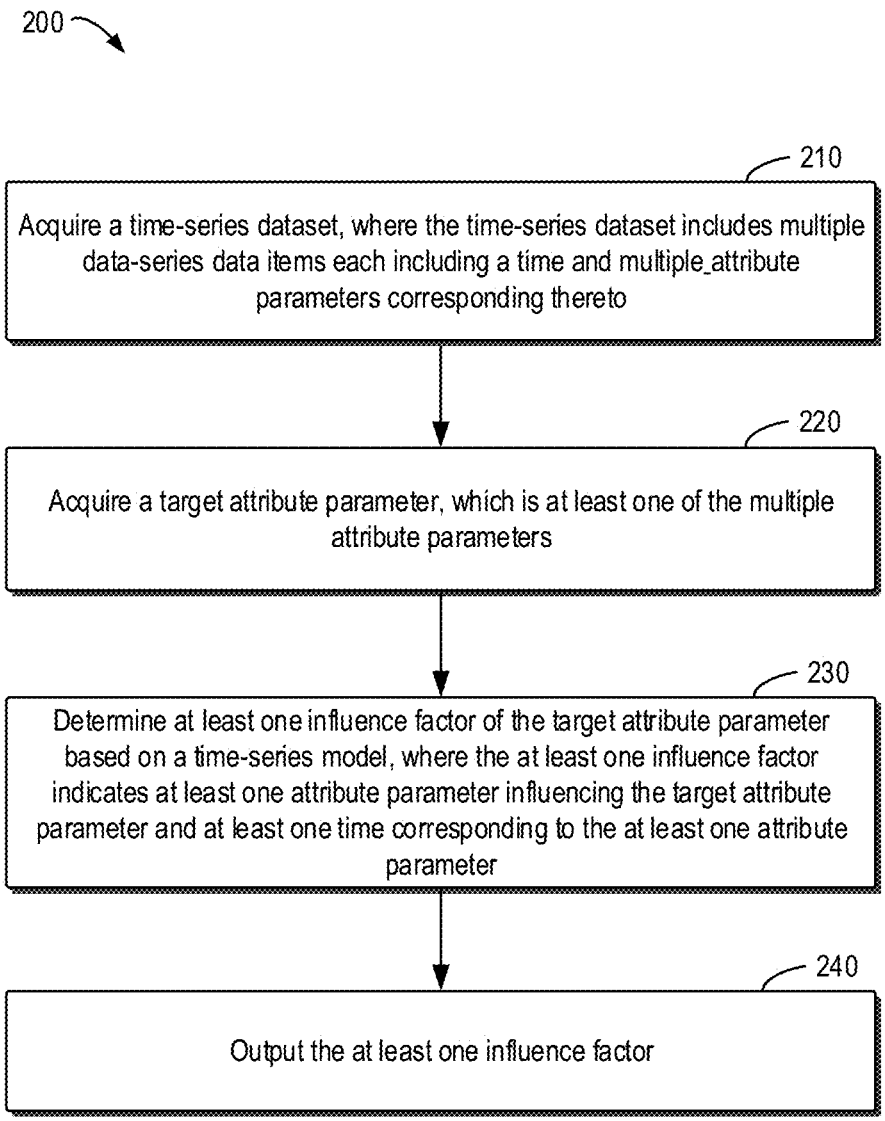
FIG. 2 illustrates a schematic flowchart of a process of data processing according to some embodiments of the present disclosure.

FIG. 2 illustrates a schematic flowchart of a process 200 of data processing according to some embodiments of the present disclosure. For example, the process 200 may be performed by the computing device 110 as shown in FIG. 1. It would be appreciated that the process 200 may include additional blocks not shown and/or may omit some blocks shown therein. The scope of the present application is not limited in the aspect.

At block 210, a time-series dataset is acquired, where the time-series dataset includes multiple data-series data items each including a time and multiple_attribute parameters corresponding thereto. At block 220, a target attribute parameter is acquired, which is at least one of the multiple attribute parameters. At block 230, at least one influence factor of the target attribute parameter is determined based on a time-series model, where the at least one influence factor indicates at least one attribute parameter influencing the target attribute parameter and at least one time corresponding to the at least one attribute parameter. At block 240, the at least one influence factor is output.

In some embodiments, the data item in the time-series dataset may be represented as $d=(t, \vec{S})$, where $\vec{S}$ is a vector comprised of multiple attribute parameters. As an example, supposing that the multiple attribute parameters includes a sales volume, a network advertisement volume, and user views, then the time-series dataset may be presented in Table 1, where a row indicates a data item.

TABLE 1

| Time point | Sales volume | Network advertisement volume | User views |
|---|---|---|---|
| T1 | 325 | 78 | 1200 |
| T2 | 131 | 35 | 800 |
| T3 | 746 | 11 | 1400 |
| T4 | 45 | 150 | 2200 |
| ... | ... | ... | ... |

It would be appreciated that the time-series dataset as shown in Table 1 above is merely provided for illustration, and the time-series dataset may be represented in other forms in actual practice, which is not limited in the present disclosure.

In some embodiments, a time-series dataset input by a user and a target attribute parameter input by the user may be acquired. For example, the target attribute parameter may be a parameter of the user's interest, or may be a parameter to be decided by a user.

In some other embodiments, an initial time-series dataset input by a user may be acquired, and the time-series dataset at block 210 is obtained after data processing. Alternatively, data processing may include denoising and/or generating augmented data item(s).

In some embodiments of the present disclosure, the time-series model may be obtained by pre-training, may be pre-built by, e.g., a data scientist, or may be obtained in other manners, which is not limited in the present disclosure. Alternatively, the time-series model may be determined from multiple candidate models.

Exemplarily, different influence factors in the at least one influence factor determined at block 230 may have different influences on the target attribute parameter. Alternatively, the influence may be represented in the form of an interval, including a maximum influence value and a minimum influence value.

In some embodiments, if multiple influence factors are determined at block 230, the multiple influence factors are ranked according to the influences, and a part or all of the multiple influence factors may be output according to the ranking. For example, one or more influence factors having the greatest influence(s) may be determined.

It would be appreciated that factor analysis, which is a data analysis technique, may be used to determine influence of an influence factor on the target attribute parameter, for example, an importance between product quality or price, or the like, and a customers' attitudes towards a brand. Therefore, through factor analysis, a prediction may be performed in advance for a more accurate decision.

In some embodiments of the present disclosure, as to a certain influence factor among the at least one influence factor determined at block 230, for example, a first influence factor indicating, e.g., a first attribute parameter, it can be determined the change of the influence of the first attribute parameter on the target attribute parameter over time. Optionally, the first influence factor may be an influence factor having the greatest influence determined through ranking.

In some embodiments, influence of an adjustment of a certain attribute parameter on the target attribute parameter may be determined. Exemplarily, an adjustment indication for a second attribute parameter may be acquired, and a relationship between the influence of the second attribute parameter on the target attribute parameter and the time is determined based on the adjustment indication.

Figure 3:
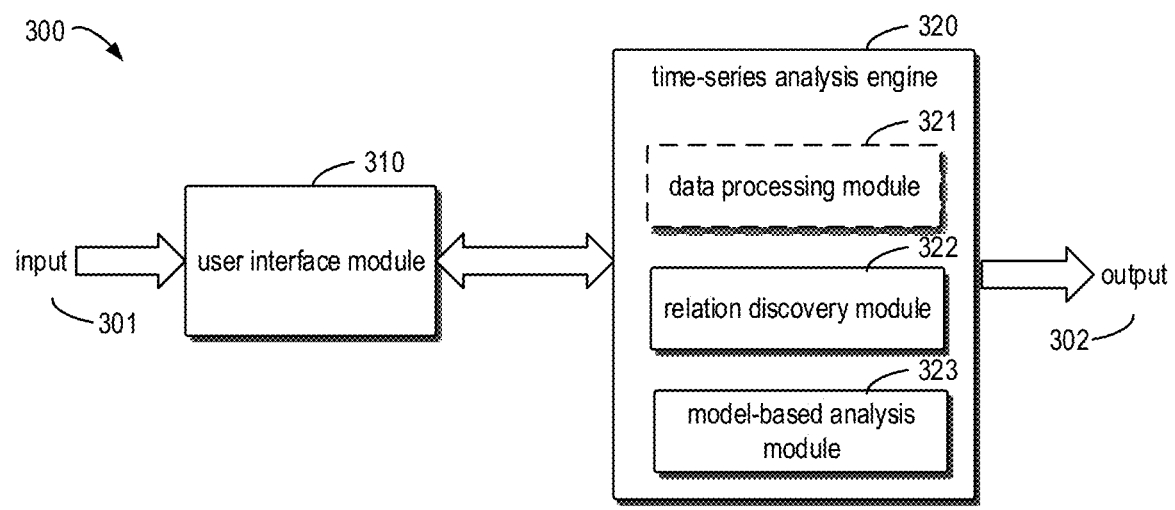
FIG. 3 illustrates a schematic block diagram of an example system according to some embodiments of the present disclosure.

FIG. 3 is a schematic block diagram of an example system 300 according to some embodiments of the present disclosure. As shown in FIG. 3, the system 300 includes a user interface module 310 and a time-series analysis engine 320. The user interface module 310 may transfer an input 301 to the time-series analysis engine 320, and the time-series analysis engine 320 may perform various operations to obtain an output 302. In addition or alternatively, the time-series analysis engine 320 may transfer the output 302 to the user interface module 310, so as to present the output 302 to the user. Exemplarily, the time-series analysis engine 320 may include a relation discovery module 322 and a model-based analysis module 323. In addition or alternatively, the time-series analysis engine 320 may further include a data processing module 321.

Figure 4:
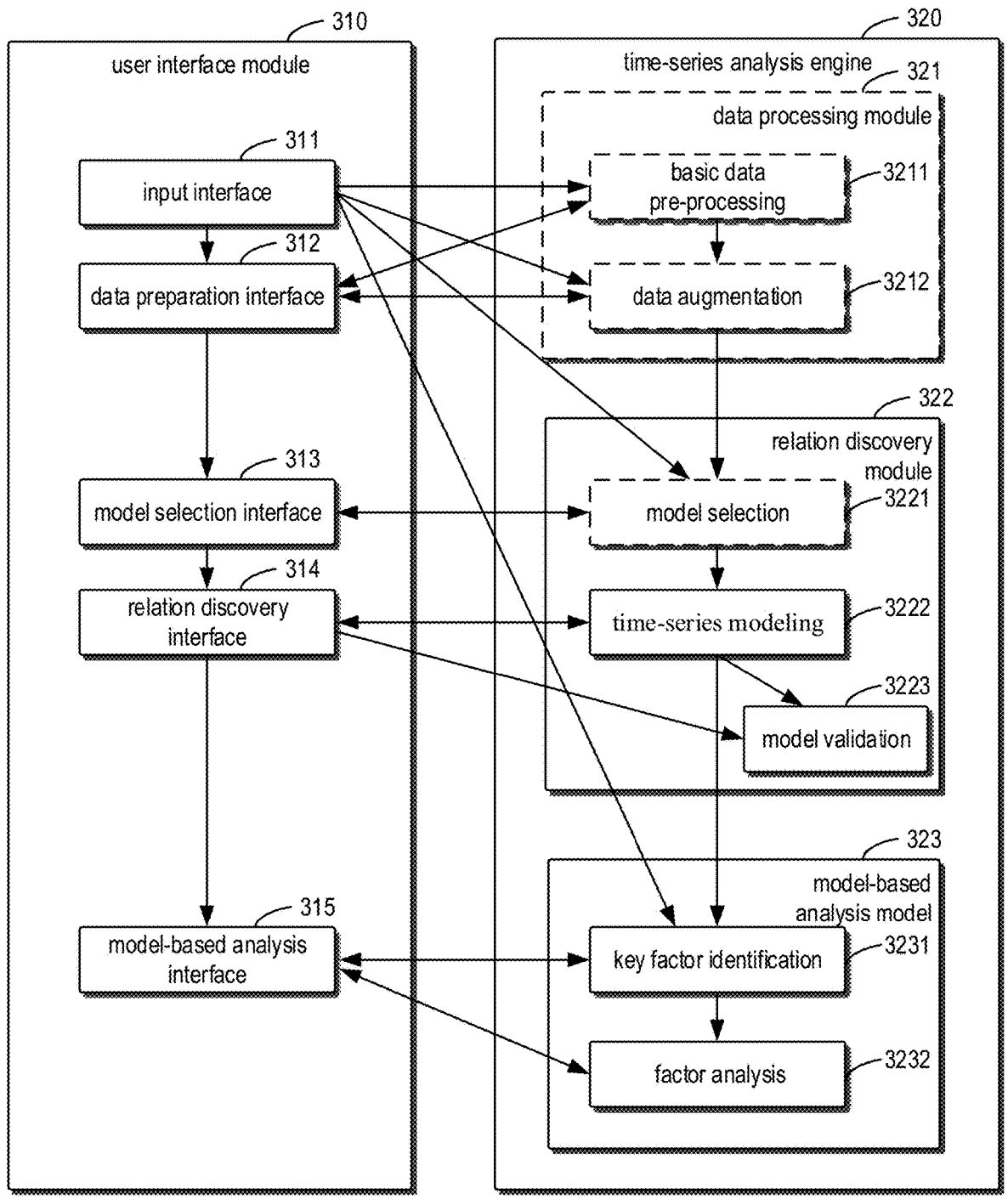
FIG. 4 illustrates a schematic block diagram of an interaction between a user interface module and a time-series analysis engine according to some embodiments of the present disclosure.

FIG. 4 is a schematic block diagram of an interaction between the user interface module 310 and the time-series analysis engine 320 according to some embodiments of the present disclosure. As shown in FIG. 4, the user interface module 310 includes an input interface 311, a data preparation interface 312, a model selection interface 313, a relation discovery interface 314 and a model-based analysis interface 315. As shown in FIG. 4, the time-series analysis engine 320 includes a data processing module 321, a relation discovery module 322, and a model-based analysis module 323. The data processing module 321 includes a basic data pre-processing submodule 3211 and a data augmentation submodule 3212, the relation discovery module 322 includes a model selection submodule 3221, a time-series modeling submodule 3222, and a model validation submodule 3223, and the model-based analysis model 323 includes a key factor identification submodule 3231 and a factor analysis submodule 3232.

Exemplarily, the relation discovery module 322 may use a causal discovery technique, to automatically explore a potential pattern from a given dataset, where the causal discovery technique may include, but is not limited to: Peter-Clark (PC) Algorithm, Greedy Equivalent Search (GES), Linear non-Gaussian Model (LinGAM), or Causal Additive Model (CAM), and the like. In the embodiments of the present disclosure, a model may be built based on a Bayesian network that can identify respective direct and indirect causes of a target, and can draw a causal conclusion by implying the causal relation.

In some examples, analysis may be performed based on a time-series model in embodiments of the present disclosure, where the time-series model may be optionally a causal model which may be represented in the form of a graph, for example.

In some embodiments, the input interface 311 may be used to receive a time-series dataset. For example, the time-series dataset may be provided to the data processing module 321. In some embodiments, the input interface 311 may be used to receive configuration information for model selection. For example, the configuration information for model selection may include advice information of a user for model selection, structure information of the time-series model, and the like. For example, the configuration information for model selection may be provided to the model selection submodule 3221. In some embodiments, the input interface 311 may be used to receive configuration information on analysis. For example, the configuration information on analysis may include a user's request and/or an indication of the target attribute parameter, and the like. Alternatively, for example, the configuration information on analysis may be provided to the key factor identification submodule 3231.

In some embodiments, the data preparation interface 312 may be used to receive configuration information on data processing. For example, the configuration information on data processing may indicate one or more of the following parameters: data transformation, a value of missing data, an outliner operation, data augmentation, or the like. For instance, the configuration information on data processing may be provided to the data processing module 321, e.g., to the basic data preprocessing submodule 3211 and the data augmentation submodule 3212.

In some embodiments, the model selection interface 313 may be used to receive the configuration information on model selection. For example, the configuration information on model selection may indicate a model selection criterion, or the like. For instance, the configuration information on model selection may be provided to the model selection submodule 3221.

In some embodiments, the relation discovery interface 314 may be used to receive configuration information on time-series modeling and/or configuration information on validation. For instance, the configuration information on time-series modeling may be provided to the time-series modeling submodule 3222. For example, the configuration information on validation may indicate a validation criterion, and may be provided to the model validation submodule 3223.

In some embodiments, the model-based analysis interface 315 may be used to receive configuration information on factor determining. For instance, the configuration information on factor determining may indicate a target attribute parameter, a number of influence factors desired to be output by a user, one or more thresholds, an adjustment indication of an attribute parameter, and the like. For instance, the configuration information on factor determining may be provided to the model-based analysis model 323, e.g., to the key factor identification submodule 3231 and the factor analysis submodule 3232.

In some embodiments, the data processing module 321 may be used to process the time-series dataset, to obtain a processed time-series dataset. Exemplarily, the basic data preprocessing submodule 3211 may perform preprocessing for the time-series dataset, for example, including data cleaning, data range analysis, and missing value filling.

In some examples, the data cleaning may include removing abnormal data items. For example, if a data item indicates that an age is over 200 years, it should be removed; for another example, if a data item indicates a price discount is more than 100%, it should be removed.

In some examples, the data range analysis may include determining a value range of a certain attribute parameter of the multiple data items. In some embodiments, the data range analysis may include determining quantile statistics such as 25%, 50%, 75%, or the like. In some examples, the data range analysis may include determining a proportion of missing values of the certain attribute parameter of the multiple data items. In some examples, the data range analysis may include determining unique values of the respective attribute parameters, and the like.

In some examples, since a failure, such as a sensor failure or the like, may occur during the process of collecting the time-series dataset, a data item may be filled in the time-series dataset during the missing value filling if there is a large interval between two adjacent times in the time-series dataset. For example, missing value filling may be performed based on the configuration information on missing values from the data preparation interface 312.

In this way, the basic data preprocessing submodule 3211 may perform preprocessing for the time-series dataset, and provide the preprocessed time-series dataset to the data augmentation submodule 3212.

Exemplarily, the basic idea of data augmentation is to generate some synthetic data items which may cover a data space not actually collected while maintaining correct labels. In general, the multiple data items in the time-series dataset may represent a uniform time series, i.e., the time series is collected at a substantially fixed time interval. However, in some fields, for example, during clinical diagnosis or an advertising campaign, sampling time is typically not continuous, or even not regular. In the embodiments of the present disclosure, an augmented data item (also referred to as synthetic data item) may be obtained through data augmentation, to expand the time-series dataset.

In some embodiments, a data generative model may be utilized to obtain augmented data items based on the time-series dataset (e.g., the preprocessed time-series dataset). By adding the augmented data items into the time-series dataset (e.g., the preprocessed time-series dataset), an augmented time-series dataset can be obtained. For example, a first data item and a second data time in the time-series dataset (e.g., the preprocessed time-series dataset) may be input into the data generative model, to obtain an augmented data item, where the first data item has a first time, the second data item has a second time, and the augmented data item has a third time. Alternatively, the data generative model may be implemented as a Directed Acyclic Graph (DAG); and the data generative model may include two submodules against each other, and may further include a third submodule for determining a difference between the outputs of the two submodules.

In this way, the data augmentation submodule 3212 may expand the time-series dataset, and provide the augmented time-series dataset to the model selection submodule 3221.

In some embodiments, the time-series model may be input by a user. For example, a data scientist may provide a time-series model according to the experience. In some embodiments, the time-series models may be classified according to the data types. For instance, the types characterized by the respective data items in different time-series datasets are different, the corresponding time-series models may be different, and a suitable time-series model may be determined, for example, based on the binary representation in the data item, the continuous performance characterization in the data item, and the like. In some embodiments, the time-series model may be performance-driven. For example, a time-series model may be selected from multiple candidate models based on the relationship between the time-series dataset and a predetermined dataset. Alternatively, the relationship used here may include a similarity between features. For instance, an extracted feature may be "{% binary=10%, |feature|=100, |sample|=10,000, % missing-Data=10%}," indicating that the proportion of the binary data is 10%, the feature dimension is 100, the number of samples is 10,000, and the proportion of missing data is 10%. For example, a predetermined dataset having the highest similarity may be determined, and a candidate model corresponding to the predetermined dataset having the highest similarity may then be determined. Alternatively, a further operation, such as fine tuning, or the like, may be performed on the determined candidate model, to obtain the time-series model. For example, fine tuning may be implemented through a real interaction with a user, which is not limited in the present disclosure. In some embodiments, the time-series model may be determined based on an application scenario.

In this way, the model selection submodule 3221 may select a time-series model for subsequent processing. For example, an optical modeling configuration may be provided to the time-series modeling submodule 3222.

In some examples, the time-series modeling submodule 3222 may be used to establish a dependence among multiple attribute parameters across time. Alternatively, a measuring method for the dependence may be covariance-based, such as a Vector Autoregressive (VAR) model, a Granger causality, or the like. Alternatively, a further measuring method for the dependence may be based on a conditional independence test, such as a Peter and Clark-Momentary Conditional Independence (PCMCI) algorithm for exploring a time-lagged-based dependence, or the like.

In this way, the time-series modeling submodule 3222 may establish the multi-variable dependence, and for example, may provide p-lag coefficient matrices to the model validation submodule 3223 and the key factor identification submodule 3231.

In some embodiments, the model validation submodule 3223 may be used to evaluate the goodness of the time-series model, for example, based on a set of metrics. Alternatively, the configuration information on validation provided by the relation discovery interface 314 may include the set of metrics. Exemplarily, the model validation method may be $R^2$, Mean Square Error (MSE), F-statistics or the like, which is not limited in the present disclosure.

In some embodiments, the key factor identification submodule 3231 may be used to determine a set of influence factors influencing the target attribute parameter, where the set of influence factors may include at least one influence factor. In some examples, a given time-series model may be used to determine all possible cause factors having influence on the target attribute parameter, and may determine a set of key factors from all the possible cause factors. For instance, the cause factors may include a time-lagged cause factor, i.e., a factor of other time lagging behind the current time has influence on the target attribute parameter of the current time. For example, the cause factors may include an instantaneous cause factor, i.e., a further attribute parameter of the current time has influence on the target attribute parameter of the current time.

In this way, the key factor identification submodule 3231 may be used to identify a factor having a significant influence on the target attribute parameter, and, for example, may provide a set of key factors to the factor analysis submodule 3232.

In some embodiments, the factor analysis submodule 3232 may perform a forward analysis or a backward analysis. Exemplarily, the forward analysis may be used to identify an impulse response having the greatest influence in the future. For example, an attribute parameter can be determined, an impulse of which may cause accumulative influence on the target attribute parameter to exceed a predetermined threshold at a given time. Exemplarily, the backward analysis may be used to understand one or more most important factors contributes to a given time. For example, at different given times (e.g., a weekday and a weekend), the determined factors are generally varied for the same target attribute parameter (e.g., restaurant selection). Alternatively, if the causal relation is linear, the consistency will be achieved in ranking associated factors across different times.

It is worth noting that, although description has been made to the example systems according to the embodiments of the present disclosure with reference to FIGS. 3-4, it is provided only for illustration, which should not be construed as limiting the embodiments of the present disclosure. For example, in the actual scenario, the data processing module 321 may be removed, or the system may further include other module(s). Details of the embodiments will be described below with reference to FIGS. 5-17.

In some embodiments, an initial time-series model may be acquired, and a time-series model (also referred to as a first time-series model) may be obtained based on the initial time-series model. In some examples, the time-series model may be obtained based on the initial time-series model and the time-series dataset. Alternatively, the time-series model may be represented in the form of a temporal skeleton, where the temporal skeleton includes nodes and edges. For ease of description, the initial time-series model may be referred to as a first temporal skeleton, and the time-series model may be referred to as a second temporal skeleton.

For example, the first temporal skeleton may be input by a user, e.g., a graph given by an expert according to the experience. In some examples, a test (e.g., t-test) may be performed for the respective edges of the first temporal skeleton, to obtain a value characterizing a significance level, which is referred to as p-value. Subsequently, it may be determined whether each edge characterizes a causal relation based on the p-value, for example, whether each edge is significantly equal to 0. If YES, the corresponding edge is retained; if NO, the corresponding edge is removed. The removed edge may be considered as a redundant edge in the first temporal skeleton. As such, by removing the redundant edges, a second temporal skeleton can be obtained.

Figure 5A:
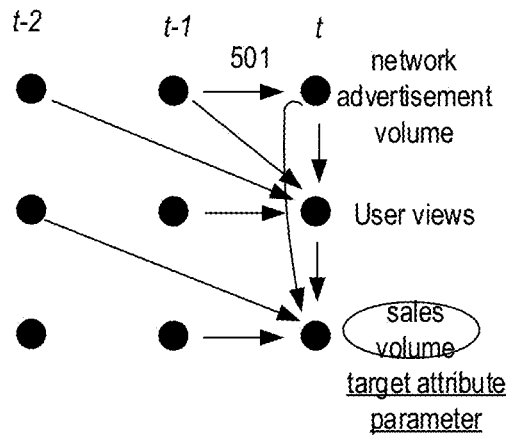
FIG. 5A illustrates a schematic diagram of a first temporal skeleton according to some embodiments of the present disclosure.

The example may be interpreted in such manner that: the input includes a first temporal skeleton, a target attribute parameter, and a time-series dataset, and the output includes a second temporal skeleton. Alternatively, the first temporal skeleton may be represented as G, for example, as shown in FIG. 5A. The first temporal skeleton shown in FIG. 5A may be input by a user (e.g., specified by an expert), or may be determined through an algorithm (e.g., built by the time-series modeling submodule 3222), which is not limited in the present disclosure.

The first temporal skeleton may represent causal relations among multiple attribute parameters at different times. For example, an arrow in FIG. 5A indicates a direction from a cause to an effect, e.g., the arrow 501 indicates a causal relation between the network advertisement volume at time t−1 and the network advertisement volume at time t. Moreover, the "sales volume" is circled in FIG. 5A as the target attribute parameter.

It would be appreciated that, in the first temporal skeleton, there may be a lagged effect, that is, history information (such as t−1 or t−2) may have influence on the current value at time t; there may also be an instantaneous effect, that is, the remaining attribute parameters at time t may have an instantaneous effect on the target attribute parameter at time t.

Figure 5B:
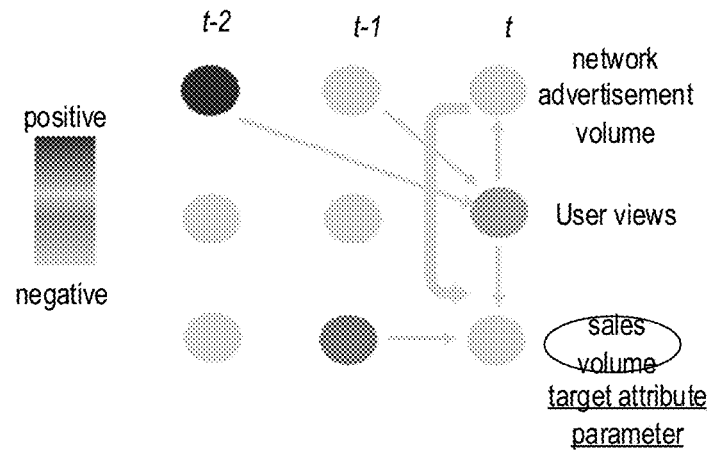
FIG. 5B illustrates a schematic diagram of a second temporal skeleton according to some embodiments of the present disclosure.
Figure 6:
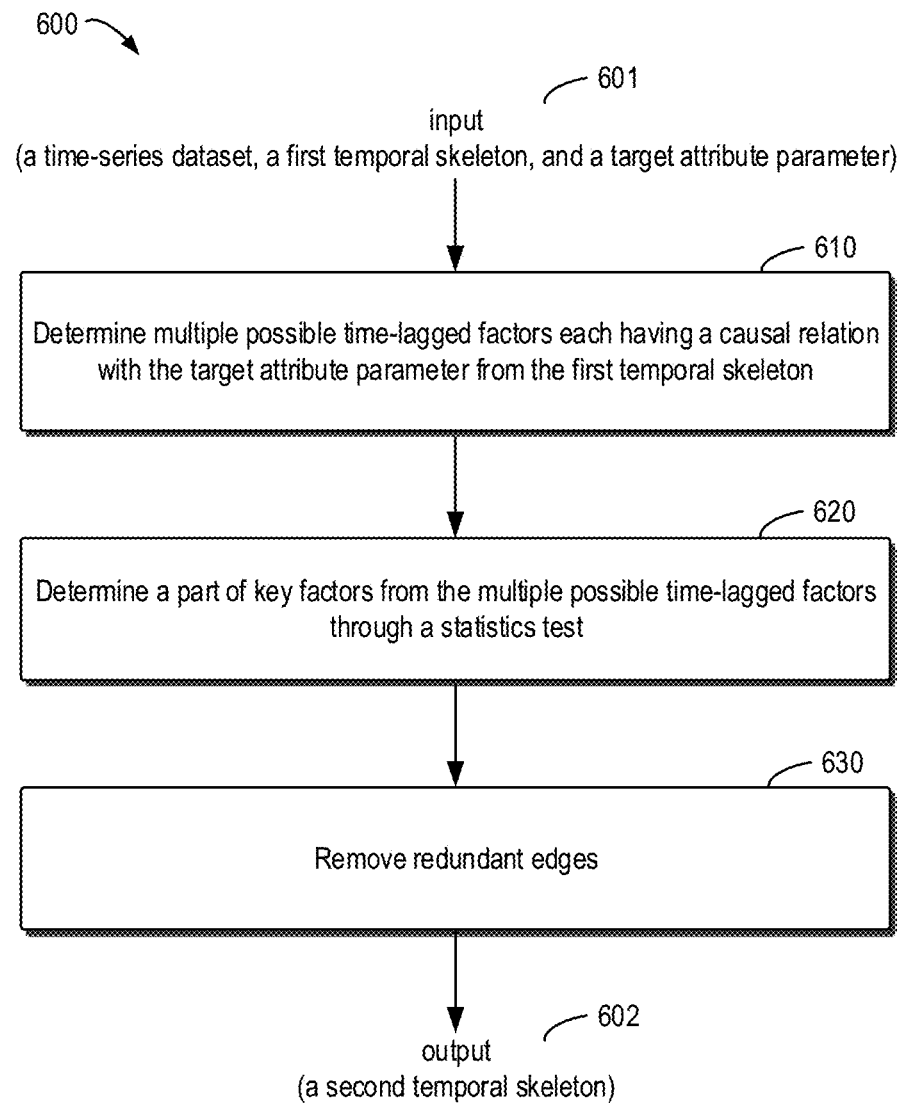
FIG. 6 illustrates an example flowchart of a process of obtaining a second temporal skeleton according to some embodiments of the present disclosure.

FIG. 6 illustrates an example flowchart of a process 600 of obtaining a second temporal skeleton according to some embodiments of the present disclosure. At block 610, multiple possible time-lagged factors each having a causal relation with the target attribute parameter are determined from the first temporal skeleton. At block 620, a part of key factors are determined from the multiple possible time-lagged factors through a statistics test. At block 630, redundant edges are removed. Exemplarily, the input 601 in FIG. 6 includes a time-series dataset (e.g., represented as X), a first temporal skeleton (represented as G), and the target attribute parameter (e.g., represented as T), while the output 602 in FIG. 6 includes a second temporal skeleton (e.g., represented as G'). As an example, the second temporal skeleton is shown as FIG. 5B. To be expressed in another way, the second temporal skeleton may also be referred to as a temporary causal graph or others, which is not limited in the present disclosure.

Alternatively, at block 610, a Structure Vector Autoregressive (SVAR) algorithm may be used, and for example, it may be supposed that all of the other attribute parameters (i.e., nodes or variables) have a direct edge towards the target attribute parameter, respectively.

Alternatively, at block 620, a t-test algorithm may be used, where the t-test arithmetic may quantify the arithmetic means to obtain a p-value of each edge, for example. Further, at block 630, if the p-value is less than a threshold, it is indicated the edge is significantly not equal to 0. If a certain edge is not significantly equal to 0, it is indicated that the starting node of the edge has a great influence on the ending node.

In some examples, the obtained second temporal skeleton (temporal causal graph) may include (tp+1)*K parameters and respective influences on the target attribute parameter, where tp is a time-lagged value (e.g., tp=2 in FIG. 5B), and K is a number of key factors (e.g., K=3 in FIG. 5B). Accordingly, the causal effect can be determined by the second temporal skeleton (temporal causal graph).

Therefore, at least one influence factor of the target attribute parameter (e.g., the sales volume in FIG. 5B) may be determined based on the second temporal skeleton, and as shown in FIG. 5B, direct influence factors of the sales volume at time t include: (t−1, sales volume), (t, network advertisement volume), and (t, user views). Each influence factor includes an attribute parameter and a corresponding time. As would be appreciated, the direct influence factor may indicate the presence of an edge directly pointed to (t, sales volume). Exemplarily, there may be other indirect influence factors which will not be listed here.

In some embodiments, each influence factor may have influence on the target attribute parameter. In an example, the influence may be represented in the form of a numerical value, for example, numerical values listed adjacent to some edges in FIG. 5B. In another example, the influence may be represented in the form of a numerical interval. In this way, the influence represented in the form of an interval can reflect more statistics information such that the causal relation can be determined more accurately.

Figure 7:
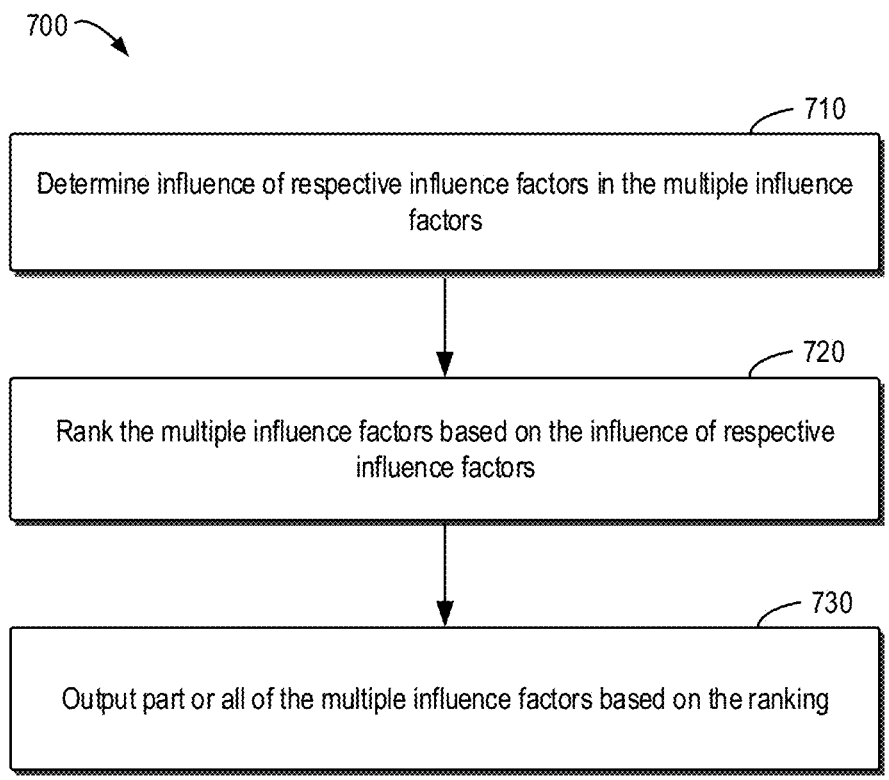
FIG. 7 illustrates a schematic flowchart of a process of determining a key factor according to some embodiments of the present disclosure.

For the multiple influence factors, some key factors therein may be determined. FIG. 7 illustrates a schematic flowchart of a process 700 of determining key factors according to some embodiments of the present disclosure. At block 710, influence of respective influence factors in the multiple influence factors is determined. At block 720, the multiple influence factors are ranked based on the influence of respective influence factors. At block 730, part or all of the multiple influence factors are output based on the ranking.

In some examples, the quantity of the part or all of the influence factors output may be specified by a user. For example, a user may input the value of the quantity via the model-based analysis interface 315, which is represented as m, for example.

The example may be interpreted in such manner that: the input includes a second temporal skeleton and a quantity m, while the output includes m key influence factors.

Alternatively, when ranking is being performed at block 720, a comparison matrix may be constructed, an influence factor having the minimum value (or maximum value) is determined from the comparison matrix, and the ranking is then determined from the minimum value (or maximum value) until the ranking is completed.

In some embodiments, if the influence is represented as a numerical interval, the relationship should be determined based on the interval upon ranking, where the relationship may include $\{<, \lesssim, =, \approx, \gtrsim, >\}$. FIG. 8A illustrates a schematic diagram of determining a relationship 810 between any two numerical intervals a and b.

Specifically, it is assumed that the first influence of the first influence factor is represented as a first interval, and the second influence of the second influence factor is represented as a second interval. In the case, the relationship between the first influence and the second influence may include: (1) if the upper limit value of the first interval is less than the lower limit value of the second interval, the first influence is less than (<) the second influence; (2) if the first interval and the second interval have an overlapping area, and the first statistic of the first interval is less than the second statistic of the second interval, the first influence is less than or equal to ($\lesssim$) the second influence; (3) if the difference between the lower limit value of the first interval and the lower limit value of the second interval is less than a first threshold, the difference between the upper limit value of the first interval and the upper limit value of the second interval is less than a second threshold, and the difference between the first statistic and the second statistic is less than a third threshold, the first influence is equal to ($\approx$) the second influence. Alternatively, the first statistic and the second statistic may have the same mathematical meaning, which may be a median of the interval, for example.

It would be appreciated that the upper limit value may also be referred to as an upper bound value, and the lower limit value may also be referred to as a lower bound value. A confidence interval may be determined based on the upper limit value and the lower limit value, and a true value is within the confidence interval. For example, the confidence interval may represent a probability of 1−α, where α is a significance level. For example, α=0.05, where: the corresponding confidence interval is reduced as a is increased; and the corresponding confidence interval is enlarged as a is decreased.

Exemplarily, at block 730, m influence factors may be determined based on the ranking. As an example, if the influence is represented in the form of a numerical interval, FIG. 8B illustrates a schematic diagram of determining two numerical intervals 820 based on a ranking of three intervals a, b and c. In the example 822 in FIG. 8B, although a$\lesssim$b$\gtrsim$c, the relationship between a and c cannot be determined directly on the basis; on the contrary, a<c can be determined through the relationship between the interval representation of a and the interval representation of c.

Figure 9:
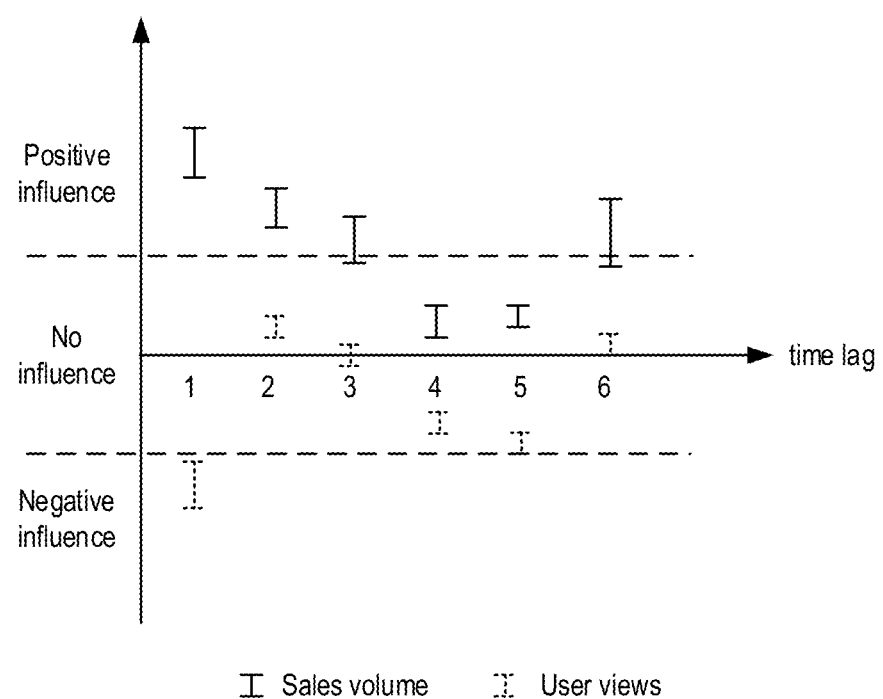
FIG. 9 illustrates representations of multiple influences according to some embodiments of the present disclosure.

In some other examples, the ranking may be represented in a two dimensional coordinate plot. FIG. 9 shows representations of multiple influences in the coordinate plot, and accordingly, m influence factors can be determined therefrom.

In some embodiments of the present disclosure, a change of influence of a specific attribute parameter on the target attribute parameter over time may be determined. Alternatively, the specific attribute parameter may be referred to as a first attribute parameter that may be specified by a user. For example, a user may input an indication of the first attribute parameter (e.g., represented as q) via the input interface 311 or the model-based analysis interface 315.

The example may be interpreted in such manner that: the input includes a second temporal skeleton, a first attribute parameter, and a target attribute parameter, and the input includes a change of influence of the first attribute parameter on the target attribute parameter over time, which is represented in the form of a vector, for example.

Figure 10A:
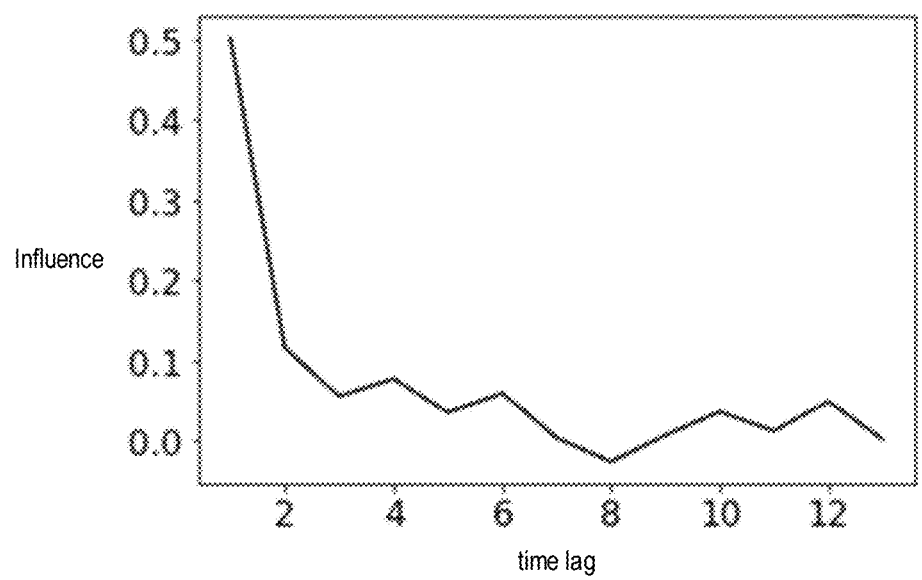
FIG. 10A illustrates a schematic graph of a change of influence of a sales volume on a target attribute parameter over time according to some embodiments of the present disclosure.
Figure 10B:
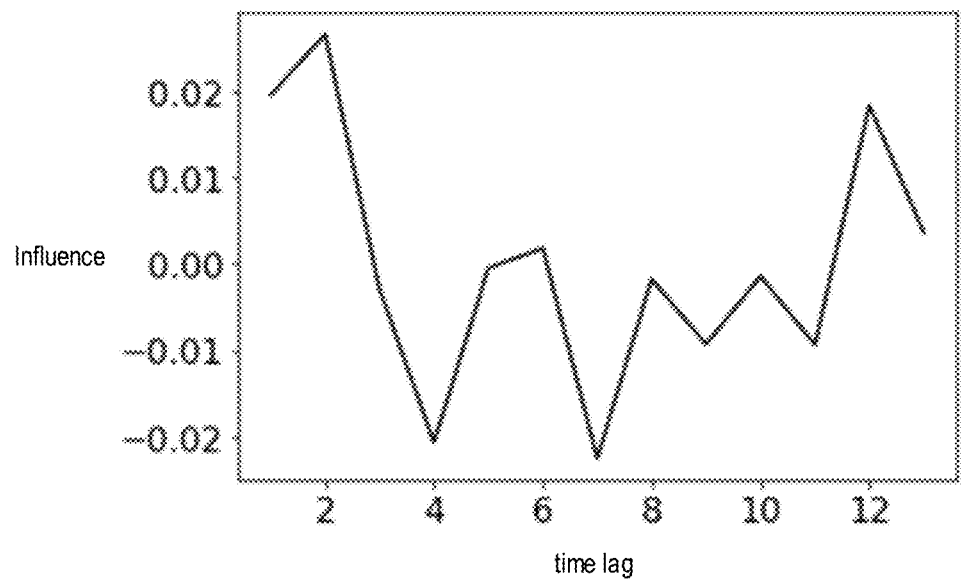
FIG. 10B illustrates a schematic graph of a change of influence of user views on a target attribute parameter over time according to some embodiments of the present disclosure.

Specifically, respective influences of the first attribute parameter on the target attribute parameter at respective times can be acquired from the second temporal skeleton, to thus obtain a change thereof over time. In an example, the change of the influence of the first attribute parameter on the target attribute parameter over time may be represented in the form of a curve (or a broken line). It is assumed that the target attribute parameter is (t, sales volume), FIG. 10A shows a time-dependent change relationship 1010 of the influence of the sales volume on the target attribute parameter, and FIG. 10B shows a time-dependent change relationship 1020 of influence of user views on the target attribute parameter. In FIGS. 10A and 10B, the horizontal axis represents a time lag, and a value of the time lag is a number of time units lagging relative to the time of the target attribute parameter (for example, the time lag 2 indicates t−2). Supposing that the time unit is day, t−2 may indicate two days before. It can be seen from FIG. 10A that the influence of the historical sales volume on the current sales volume is in a downward trend. It can be seen from FIG. 10B that the historical user views have influence on the current sales volume both in a short term (e.g., 3 days before) and a long term (e.g., two weeks before).

Figure 11:
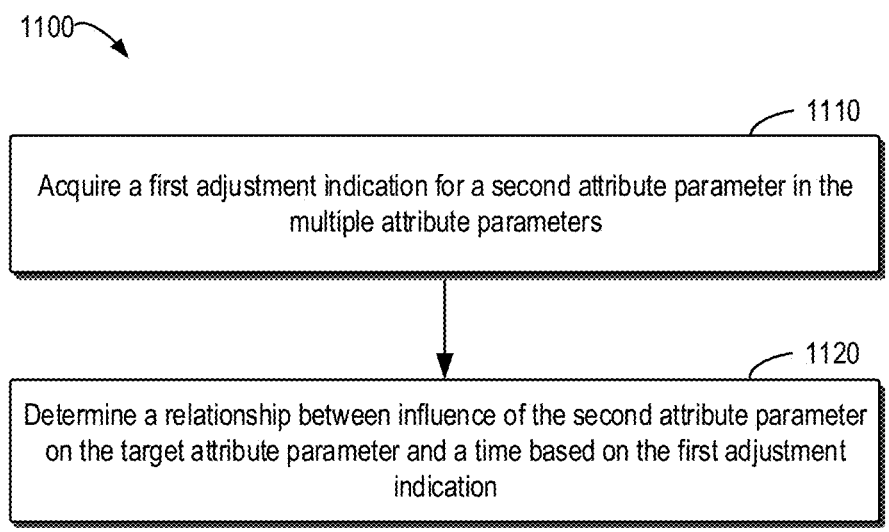
FIG. 11 illustrates a schematic flowchart of a process of determining a response relationship according to some embodiments of the present disclosure.

In some embodiments of the present disclosure, a model response may also be determined. Exemplarily, one or more attribute parameters are adjusted, and a response of the target attribute parameter can be determined. Exemplarily, an attribute parameter causing a greatest response of the target attribute parameter can be determined. FIG. 11 illustrates a schematic flowchart of a process 1100 of determining a response relationship according to some embodiments of the present disclosure. At block 1110, a first adjustment indication for a second attribute parameter in the multiple attribute parameters is acquired. At block 1120, a relationship between influence of the second attribute parameter on the target attribute parameter and a time is determined based on the first adjustment indication.

In some examples, the influence of the second attribute parameter on the target attribute parameter within a preset time period can be determined. For example, the preset time period may be input by a user, e.g., a user may input a value of the preset time period via the model-based analysis interface 315, which may be presented as D, for example.

The example may be interpreted in such manner that: the input includes a second temporal skeleton, a target attribute parameter, a preset time period D, and a first adjustment indication for the second attribute parameter. The output may include a change of a response within the preset time period D, which may be represented as a vector including D elements, for example.

Figure 12A:
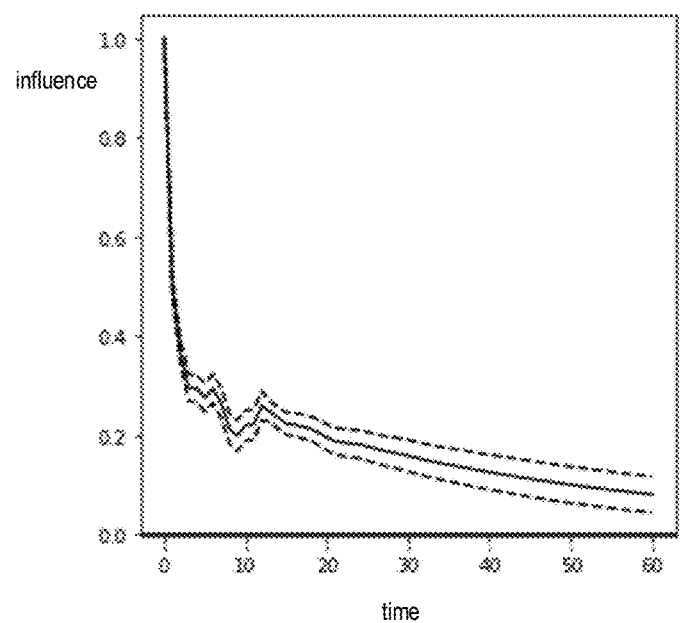
FIG. 12A illustrates a schematic graph of a change of influence of an adjustment to a sales volume on a target attribute parameter over time according to some embodiments of the present disclosure.
Figure 12B:
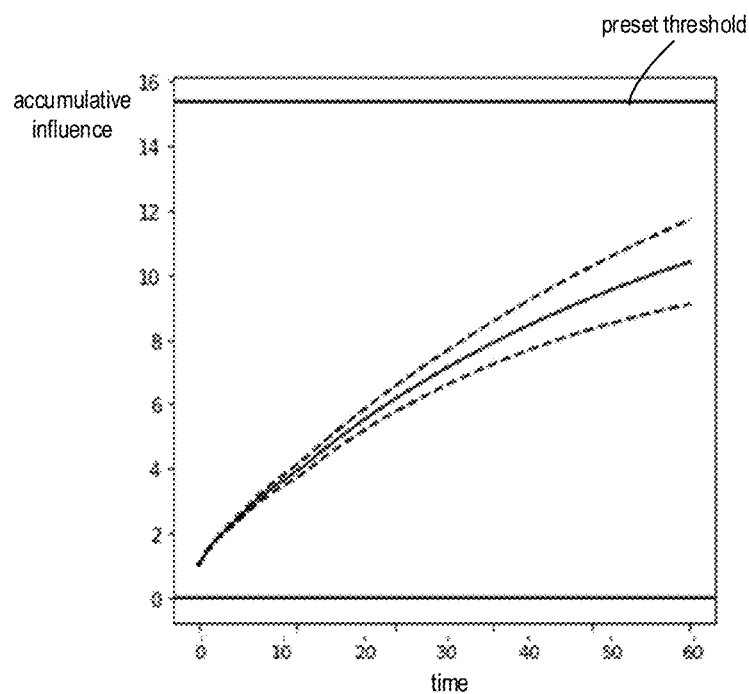
FIG. 12B illustrates a schematic graph of a change of accumulative influence of an adjustment to sales volumes on a target attribute parameter over an accumulation of time according to some embodiments of the present disclosure.

In some embodiments, the relationship determined at block 1120 may be represented as a change of the influence over time (where the time range is the preset time period D), or may be represented as a change of accumulative influence over time (where the time range is the preset time period D). For example, it is assumed that the target attribute parameter is (t, sales volume), and the second attribute parameter is sales volume, FIG. 12A shows a change of influence of an adjustment of the sales volume on the target attribute parameter over time, and FIG. 12B shows a change of accumulative influence of an adjustment of the sales volume on the target attribute parameter over an accumulation of time.

Alternatively, whether the accumulative influence within the preset time period is greater than a preset threshold can be further determined. Referring to FIG. 12B, supposing that the preset threshold is 15, then the accumulative influence within the preset time period is less than the preset threshold.

In some other examples, two or more attribute parameters may be adjusted separately or simultaneously, to determine a response of the target attribute parameter within the preset time period D. Exemplarily, a second adjustment indication for a third attribute parameter may also be acquired, and a relationship between influence of the third attribute parameter on the target attribute parameter and the preset time period may be determined based on the second adjustment indication. Exemplarily, an attribute parameter having the greatest influence on the target attribute parameter from the second attribute parameter and the third attribute parameter may be determined.

Figure 13A:
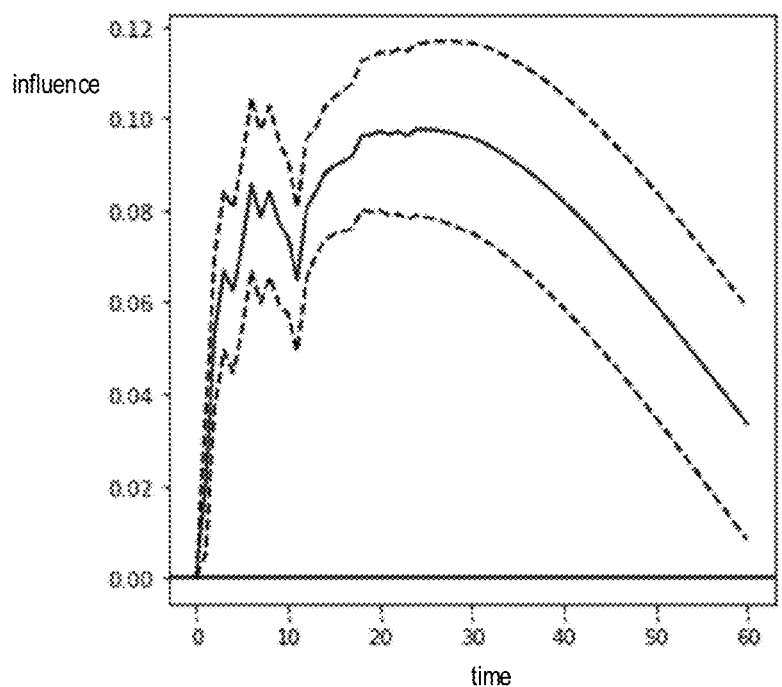
FIG. 13A illustrates a schematic graph of a change of influence of an adjustment to user views on a target attribute parameter over time according to some embodiments of the present disclosure.
Figure 13B:
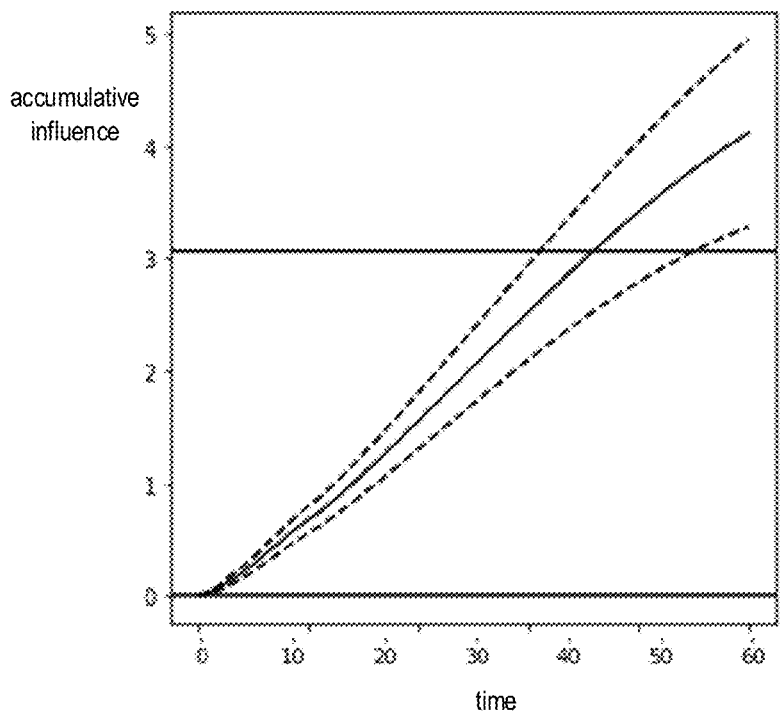
FIG. 13B illustrates a schematic graph of a change of accumulative influence of an adjustment to user views on a target attribute parameter over an accumulation of time according to some embodiments of the present disclosure.

For example, it is assumed that the target attribute apparatus is (t, sales volume), and the third attribute parameter is user views, FIG. 13A shows a change of influence of an adjustment of user views on the target attribute parameter over time, and FIG. 13B shows a change of accumulative influence of an adjustment of user views on the target attribute parameter over an accumulation of time. Through comparison of FIG. 12A with FIG. 13A, it can be seen that the influence of the sales volume is greater.

In addition or alternatively, the most effective time point may be further determined, which represents a time when the optimal effect can be reached if a decision is made. In this way, if an adjustment indication for an attribute parameter is considered as a decision, the most effective time point of the decision can be determined on the basis. For example, a threshold of an expected effect can be determined, a parameter adjustment effect can be simulated, and the time point can be determined by determining a relationship (e.g. an intersection) between the adjusted effect and the expected effect. As such, a better decision can be made on the basis.

According to embodiments as described above with reference to FIGS. 2-13B, the present disclosure provides a data processing solution, where at least one influence factor for a target attribute parameter may be determined based on a time-series dataset and a time-series model. Therefore, an accurate reference can be provided for a decision regarding the target attribute parameter, and the decision made in this way can be more accurate.

Figure 14:
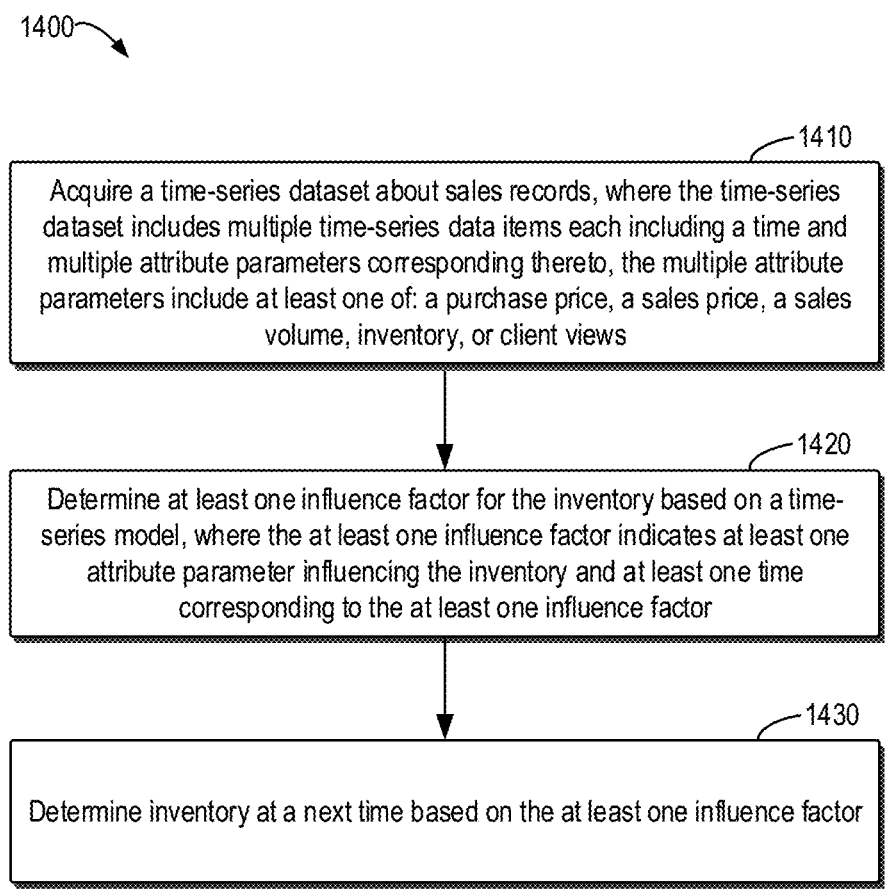
FIG. 14 illustrates a schematic flowchart of a process of determining inventory according to some embodiments of the present disclosure.

It would be appreciated that embodiments of the present disclosure can be applied in a variety of fields. Take the sales field as an example, FIG. 14 illustrates a schematic flowchart of a process 1400 of determining inventory according to some embodiments of the present disclosure. At block 1410, a time-series dataset about sales records is acquired, where the time-series dataset includes multiple time-series data items each including a time and multiple attribute parameters corresponding thereto, where the multiple attribute parameters include at least one of: a purchase price, a sales price, a sales volume, inventory, or client views. At block 1420, at least one influence factor for the inventory is determined based on a time-series model, where the at least one influence factor indicates at least one attribute parameter influencing the inventory and at least one time corresponding to the at least one influence factor. At block 1430, inventory at a next time is determined based on the at least one influence factor. Exemplarily, in the sales field, if the target attribute parameter is the inventory, a key factor having a causal relation with the inventory can be determined according to the embodiments of the present disclosure. It is to be understood that FIG. 14 is provided only for illustration, and in the actual scenario, the target attribute parameter may be other variable, such as sales profit, or the like, which is not limited in the present disclosure.

Figure 15:
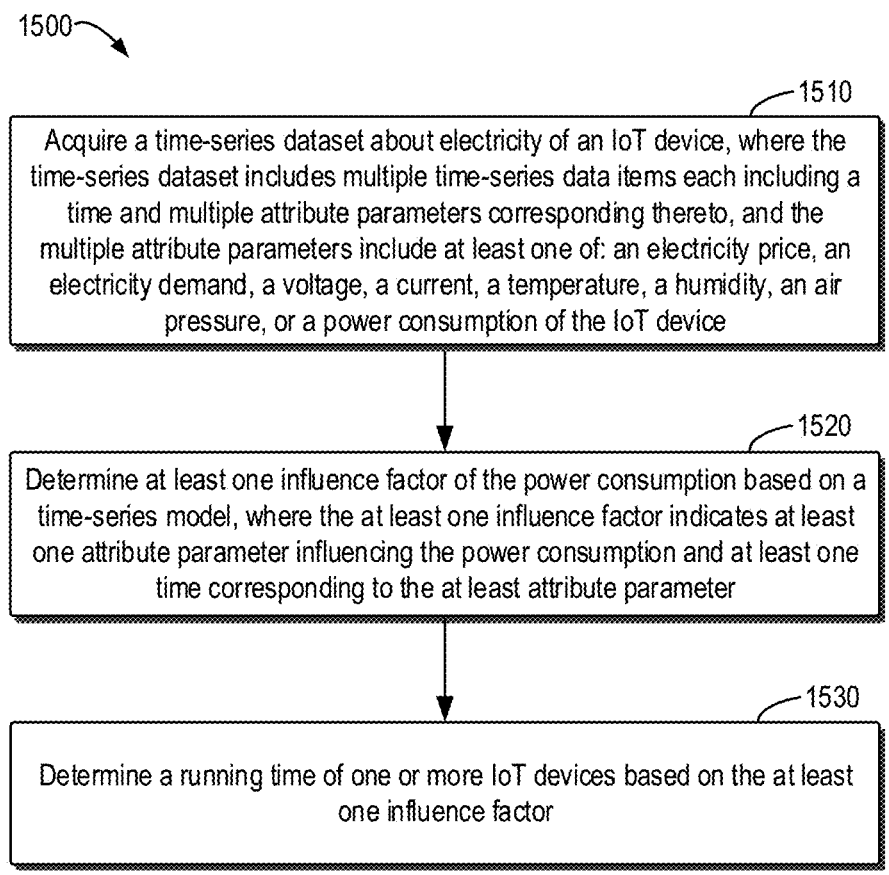
FIG. 15 illustrates a schematic flowchart of a process of determining a device running time according to some embodiments of the present disclosure.

In some other examples, take the green energy field as an example, FIG. 15 illustrates a schematic flowchart of a process 1500 of determining a device running time according to some embodiments of the present disclosure. At block 1510, a time-series dataset about electricity of an IoT device is acquired, where the time-series dataset includes multiple time-series data items each including a time and multiple attribute parameters corresponding thereto, and the multiple attribute parameters include at least one of: an electricity price, an electricity demand, a voltage, a current, a temperature, a humidity, an air pressure, or a power consumption of the IoT device. At block 1520, at least one influence factor of the power consumption is determined based on a time-series model, where the at least one influence factor indicates at least one attribute parameter influencing the power consumption and at least one time corresponding to the at least attribute parameter. At block 1530, a running time of one or more IoT devices is determined based on the at least one influence factor. Exemplarily, in the green energy field, if the target attribute parameter is the power consumption, a key factor having a causal relation with the power consumption can be determined according to embodiments of the present disclosure. It is to be understood that FIG. 15 is provided only for illustration, and in the actual scenario, the target attribute parameter may be other variable, such as household electricity expenses, or the like, which is not limited in the present disclosure.

Alternatively, the IoT device may be an Artificial Intelligence-Internet of Things (AIoT) device, and a device or a system for energy consumption control of the IoT device may be a green AIoT controller. It would be appreciated that the modern I-T devices, such as appliances, cooking utensils, and the like, are increasingly powerful, but energy consumption is fulfilled at the cost of air pollution, water pollution, deforestation, and the like. In the background, green transformation represents an initiative that uses digital technologies to solve such environmental challenges while also achieving economic growth. For example, in a household environment, according to the green transformation, the internal environment of the household should be maintained at an appropriate level via a controller such that all the household appliances operate properly under a premise of an economic growth. For example, the refrigerator will consume more power in a hot and humid environment. Air conditioners and ventilation systems can work together to improve the working conditions. However, if all appliances are running at a peak time, the low voltage will cause the refrigerator to run longer and take more power to reach a predetermined temperature. According to the embodiments of the present disclosure, the green AIoT controller can collect the electricity price in real time, sense the internal temperature and humidity, obtain user behavior patterns, and analyze the collected data. As such, power-consumption operations can be determined, and further, the purpose of green transformation can be accomplished.

Figure 16:
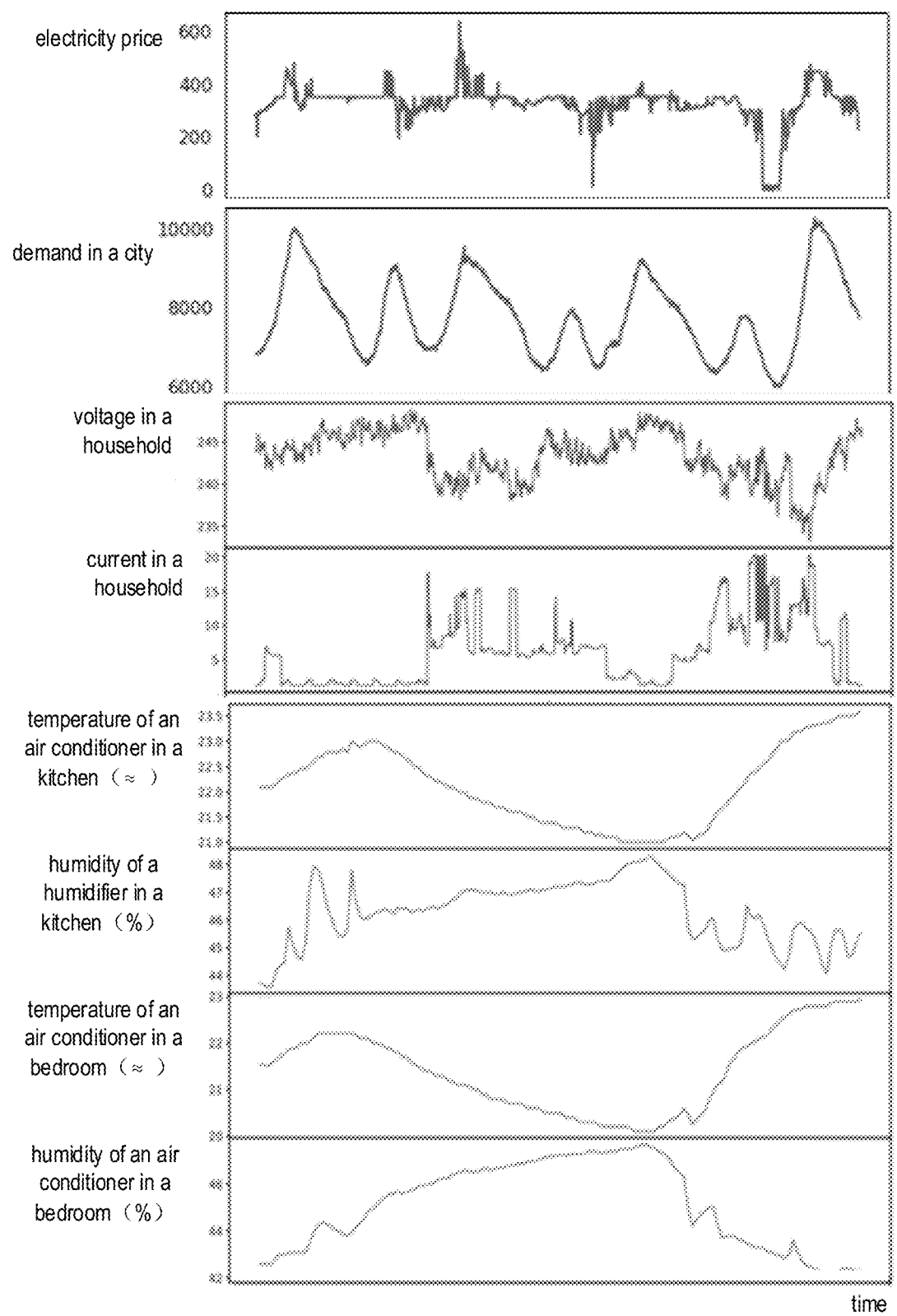
FIG. 16 illustrates a schematic graph of changes of multiple collected attribute parameters over time according to some embodiments of the present disclosure.

For example, the time-series dataset may be obtained by collecting changes of the multiple attribute parameters over time. FIG. 16 shows changes of an electricity price, a demand in a city, a voltage in a household, a current in a household, a temperature of an air conditioner in a kitchen, a humidity of a humidifier in a kitchen, a temperature of an air conditioner in a bedroom, a humidity of a humidifier in the bedroom over time. Alternatively, the horizontal axis represents time in a unit of minute, hour, or others, which is not limited in the present disclosure.

According to the embodiments of the present disclosure, supposing that total power consumption of the household is the target attribute parameter, it can be determined that the key factors influencing the target attribute parameter includes the electricity price an hour ago, the current power consumption of the air conditioner in the kitchen, and the like. In addition, the determination may be made based on the time-series dataset, and a peak demand in the city may lead to a peak in electricity price. On the basis, the controller may determine running times for the respective electrical appliances in the household. For example, the controller may cause most of the electrical appliances to operate at non-peak periods in the city.

Figure 17:
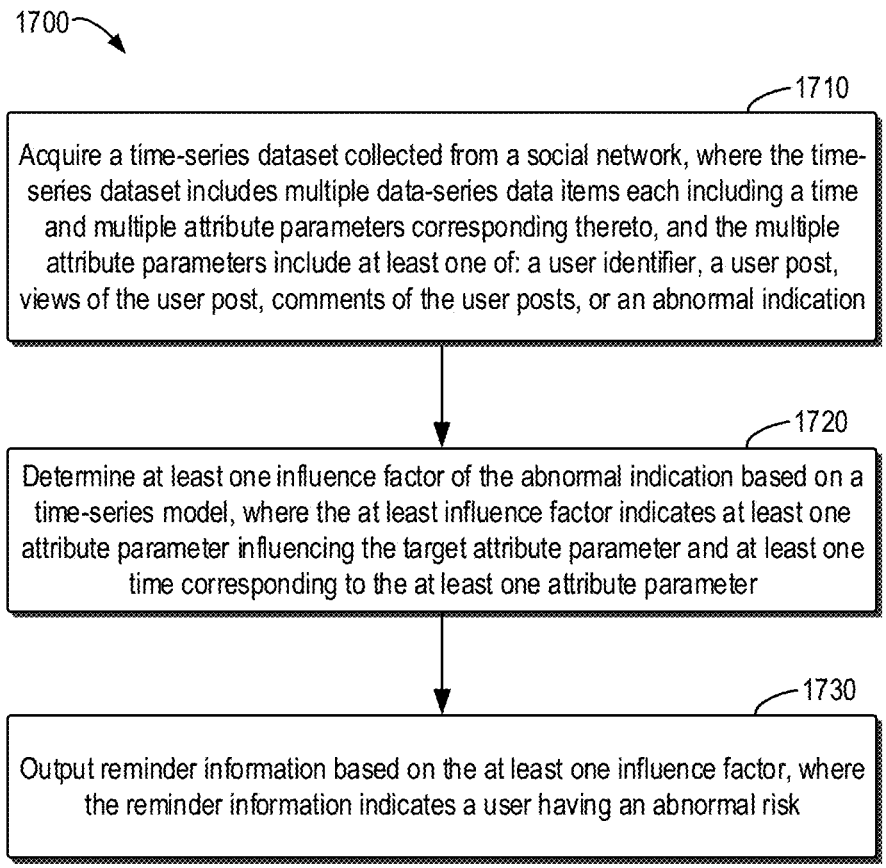
FIG. 17 illustrates a schematic flowchart of a process of determining an abnormal event according to some embodiments of the present disclosure.

In some other examples, take the field of abnormal event processing based on a social network as an example, FIG. 17 illustrates a schematic flowchart of a process 1700 of determining an abnormal event according to some embodiments of the present disclosure. At 1710, a time-series dataset collected from a social network is acquired, where the time-series dataset includes multiple data-series data items each including a time and multiple attribute parameters corresponding thereto, and the multiple attribute parameters include at least one of: a user identifier, a user post, views of the user post, comments of the user posts, or an abnormal indication. At block 1720, at least one influence factor of the abnormal indication is determined based on a time-series model, where the at least influence factor indicates at least one attribute parameter influencing the target attribute parameter and at least one time corresponding to the at least one attribute parameter. At block 1730, reminder information is output based on the at least one influence factor, where the reminder information indicates a user having an abnormal risk.

Exemplarily, the abnormal indication may include an indication on whether a user is to commit suicide, an indication on whether a user is to commit an illegal act, and the like. For ease of description, the description below will be made with a user suicide event as the abnormal event.

Data from the World Health Organization suggest that close to 800,000 suicide every year, i.e., a tragedy occurs approximately every 40 seconds. Due to the nature of its rare occurrence, there was very little data available. However, because of the booming development of the Internet, the amount of data on social media has increased dramatically. It is worth expecting to find the cause and effect of suicide from social media so as to implement effective intervention. The device or system for determining an abnormal event through a social network may be referred to as emotional robot. By collecting instant activities of a user, updates of the user in the social network, and influential news, fluctuations in the user's status can be captured. For example, a time-series dataset can be obtained by collecting the respective attribute parameters at different times.

In some embodiments, the time-series dataset may be divided into a first subset and a second subset. The first subset may be a suicide dataset indicating that users therein committed suicide. The second subset may be a non-suicide dataset indicating that users therein have not committed suicide. In some examples, by similarity matching, one or more non-suicide users having a similarity with the suicide dataset greater than a threshold can be determined from the non-suicide dataset.

As an example, for instance, respective time series of 20 suicide users may be acquired, and respective time series of 80 non-suicide users (normal users) may be acquired. A corresponding time-series model can be constructed based on the corresponding time series of each user.

"Emotion" may be used as the target attribute parameter. For example, based on text information of a user, emotion may be represented in a numerical value through analysis, where the text information of the user may include posts, comments, and the like, of the user.

For example, it may be assumed that current "emotion" of one non-suicide user (e.g., User 1) of the determined 80 non-suicide users (normal users) may be characterized as:

Emotion($t$)=5×Emotion($t$−1)+2×views($t$−1)+5×views ($t$−2).

For instance, it may be assumed that current "emotion" of one suicide user (e.g., User 2) of the 20 suicide users may be characterized as follows:

Emotion($t$)=−3×late-night posts($t$−1)−15×Emotion($t$−1)−5×Emotion($t$−3)+2×views($t$−2).

In the above equations, the Emotion ($t$) may be the current emotion, $t$−1 is a time lag with a time unit, $t$−2 is a time lag with two time units, and $t$−3 is a time lag with three time units. For example, if the time unit is "day," $t$−1, $t$−2, and $t$−3 represent a day ago, two days ago, and three days ago, respectively.

Figure 18A:
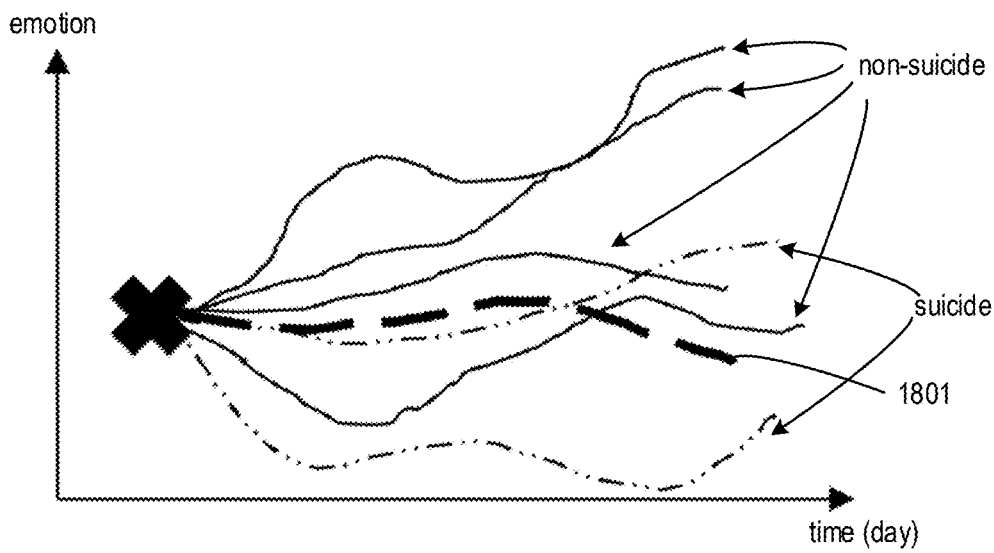
FIGS. 18A-18C illustrate schematic graphs of determining an abnormal risk according to some embodiments of the present disclosure.
Figure 18B:
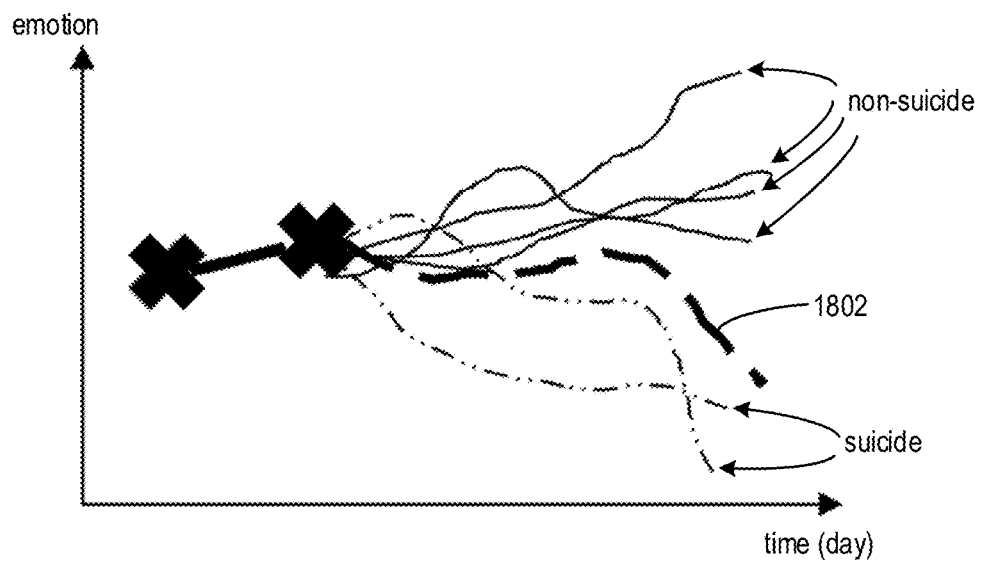
Figure 18C:
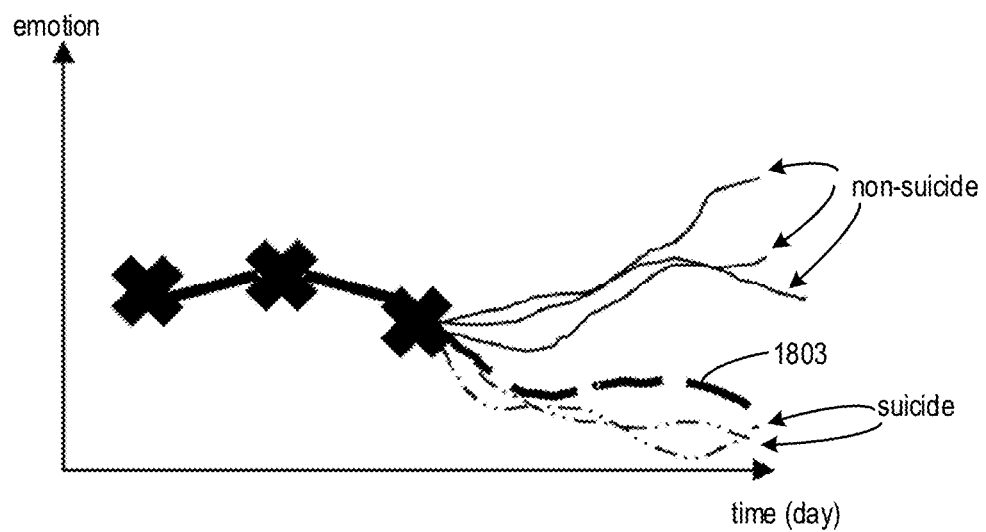

FIGS. 18A-18C illustrate schematic diagrams of determining an abnormal risk according to some embodiments of the present disclosure. Specifically, for a specific user (e.g., User xyz), a time series of the specific user may be collected, and an emotion of the specific user may be determined (e.g., predicted) based on the time series of the specific user.

Referring to FIG. 18A, it is assumed that the collected actual data of the specific user is represented by "x," and the predicted emotion is shown by the dashed line 1801. In addition, FIG. 18A further shows, for example, emotion curves (solid lines) of 4 non-suicide users and emotion curves (dash-dotted lines) of 2 suicide users. Through analysis, it can be determined that the specific user has a similarity of 52% with the suicide users, and a similarity of 48% with the non-suicide users. For instance, supposing that the threshold is 80%, the reminder information may not be output based on FIG. 18A since 52%<80%.

Referring to FIG. 18B, it is assumed that the collected actual data of the specific user is indicated by "x," and the predicted emotion is shown by the dashed line 1802. In addition, FIG. 18B further shows, for example, emotion curves (solid lines) of 4 non-suicide users and emotion curves (dash-dotted lines) of 2 suicide users. Through analysis, it can be determined that the specific user has a similarity of 73% with the suicide users, and a similarity of 27% with the non-suicide users. For instance, supposing that the threshold is 80%, the reminder information may not be output based on FIG. 18B since 73%<80%.

Referring to FIG. 18C, it is assumed that the collected actual data of the specific user is indicated by "x," and the predicted emotion is shown by the dashed line 1803. In addition, FIG. 18C further shows, for example, emotion curves (solid lines) of 3 non-suicide users and emotion curves (dash-dotted lines) of 2 suicide users. Through analysis, it can be determined that the specific user has a similarity of 89% with the suicide users, and a similarity of 11% with the non-suicide users. For instance, supposing that the threshold is 80%, the reminder information indicating a risk of the specific user committing suicide may be output based on FIG. 18C since 89%>80%.

It would be appreciated that, the examples shown in FIGS. 18A-18C are provided only for illustration. For instance, more or fewer emotion curves of non-suicide users and emotion curves of suicide users may be shown therein, which is not limited in the present disclosure. In addition, although the horizontal axis in FIGS. 18A-18C represents a time (day), the time unit may be others in the actual scenario, which is not limited in the present disclosure.

In this way, the embodiments of the present disclosure can determine a user having an abnormal risk based on a time series of the user on the social media, and output reminder information. As such, timely intervention and help can be provided to reduce, or even avoid, a tragedy.

It would be appreciated that, although applications to some fields have been described above with reference to FIGS. 14-18C, description about those fields are provided only for illustration, without suggesting any limitation to the scope of the present disclosure. The embodiments of the present disclosure may be applied to various fields containing the similar problems, which will not be listed herein.

In some embodiments, a computing device includes a circuit configured to perform the following: acquiring a time-series dataset, the time-series dataset comprising a plurality of time-series data items each comprising a time and a plurality of attribute parameters corresponding thereto; acquiring a target attribute parameter being at least one of the plurality of attribute parameters; determining, based on a time-series model, at least one influence factor of the target attribute parameter, the at least one influence factor indicating at least one attribute parameter influencing the target attribute parameter and at least one time corresponding to the at least one attribute parameter; and outputting the at least one influence factor.

In some embodiments, each of the at least one influence factor has influence on the target attribute parameter, the influence being represented in a form of an interval.

In some embodiments, the at least one influence factor comprises a plurality of influence factors, and the computing device comprises a circuit configured to perform the following operations of: determining influence of respective influence factors in the plurality of influence factors on the target attribute parameter; ranking, based on the influence of respective influence factors, the plurality of influence factors; and outputting, based on the ranking, part or all of the plurality of influence factors.

In some embodiments, the plurality of influence factors comprise a first influence factor having first influence represented as a first interval on the target attribute parameter, and a second influence factor having second influence represented as a second interval on the target attribute parameter, and the computing device comprises a circuit configured perform the following operation: if an upper limit value of the first interval is less than a lower limit value of the second interval, the first influence is less than the second influence; if the first interval and the second interval have an overlapping area, and a first statistic of the first interval is less than a second statistic of the second interval, the first influence is less than or equal to the second influence; or if a difference between a lower limit value of the first interval and the lower limit value of the second interval is less than a first threshold, a difference between the upper limit value of the first interval and an upper limit value of the second interval is less than a second threshold, and a difference between the first statistic and the second statistic is less than a third threshold, the first influence is equal to the second influence.

In some embodiments, the computing device comprises a circuit configured to perform the following operation of: determining a change of influence of a first attribute parameter in the plurality of attribute parameters on the target attribute parameter over time.

In some embodiments, the computing device comprises a circuit configured to perform the following operation of: acquiring an indication of the first attribute parameter input by a user.

In some embodiments, the computing device comprises a circuit configured to perform the following operations of: acquiring a first adjustment indication for a second attribute parameter in the plurality of attribute parameters; and determining, based on the first adjustment indication, a relationship between influence of the second attribute parameter on the target attribute parameter and a time.

In some embodiments, the relationship between the influence of the second attribute parameter on the target attribute parameter and the time indicates at least one of: a change of the influence of the second attribute parameter on the target attribute parameter over time; or a change of accumulative influence of the second attribute parameter on the target attribute parameter over an accumulation of time.

In some embodiments, the computing device comprises a circuit configured to perform the following operation of: determining, based on the change of the accumulative influence of the second attribute parameter on the target attribute parameter over the accumulation of time, whether the accumulative influence within a preset time period reaches a preset threshold.

In some embodiments, the computing device comprises a circuit configured to perform the following operations of: acquiring a second adjustment indication of a third attribute parameter in the plurality of attribute parameters; and determining, based on the first adjustment indication and the second adjustment indication, an attribute parameter having greater influence on the target attribute parameter from the second attribute parameter and the third attribute parameter.

In some embodiments, the computing device comprises a circuit configured to perform the following operation of: acquiring the first adjustment indication input by a user.

In some embodiment, the computing device comprises a circuit configured to perform the following operations of: acquiring an initial time-series model; and removing redundant edges by testing the initial time-series model, to thus obtain the time-series model.

In some embodiments, the computing device comprises a circuit configured to perform the following operation of: selecting, based on a relationship between the time-series dataset and a predetermined dataset, the time-series model from a plurality of candidate models.

In some embodiments, the computing device comprises a circuit configured to perform the following operations of: acquiring an initial time-series dataset; performing at least one of the following processing on the initial time-series dataset to obtain the time-series dataset: removing a noise data item, or generating an augmented data item.

In some embodiments, the computing device comprises a circuit configured to perform the following operation of: inputting a first data item and a second data item from the initial time-series dataset into a data generative model, to obtain the augmented data item, wherein the first data item has a first time, the second data item has a second time, and the augmented data item has a third time.

In some embodiments, the computing device comprises a circuit configured to perform the following operations of: acquiring a time-series dataset about sales records, the time-series dataset comprising a plurality of time-series data items each comprising a time and a plurality of attribute parameters corresponding thereto, the plurality of attribute parameters comprising at least one of: a purchase price, a sales price, a sales volume, inventory, or client views; determining, based on a time-series model, at least one influence factor of the inventory, the at least influence factor indicating at least one attribute parameter influencing the inventory and at least one time corresponding to the at least one attribute parameter; and determining, based on the at least one influence factor, inventory at a next time.

In some embodiments, the computing device comprises a circuit configured to perform the following operations of: acquiring a time-series dataset about electricity of an Internet of Things device, the time-series dataset comprising a plurality of time-series data items each comprising a time and a plurality of attribute parameters corresponding thereto, the plurality attribute parameters comprising at least one of: an electricity price, a power demand, a voltage, a current, a temperature, a humidity, an air pressure, or a power consumption of the Internet of Things device; determining, based on a time-series model, at least one influence factor of the power consumption, the at least one influence factor indicating at least one attribute parameter influencing the power consumption and at least one time corresponding to the at least attribute parameter; and determining, based on the at least one influence factor, a running time of the Internet of Things device.

In some embodiments, the computing device comprises a circuit configured to perform the following operations of: acquiring a time-series dataset collected from a social network, the time-series dataset comprising a plurality of time-series data items each comprising a time and a plurality of attribute parameters corresponding thereto, the plurality of attribute parameters comprising at least one of: a user identifier, a user post, views of the user post, comments of the user post, or an abnormal indication; determining, based on a time-series model, at least on influence factor of the abnormal indication indicating at least one attribute parameter influencing the target attribute parameter and at least one time corresponding to the at least one attribute parameter; and outputting, based on the at least one influence factor, reminder information indicating a user having an abnormal risk.

Figure 19:
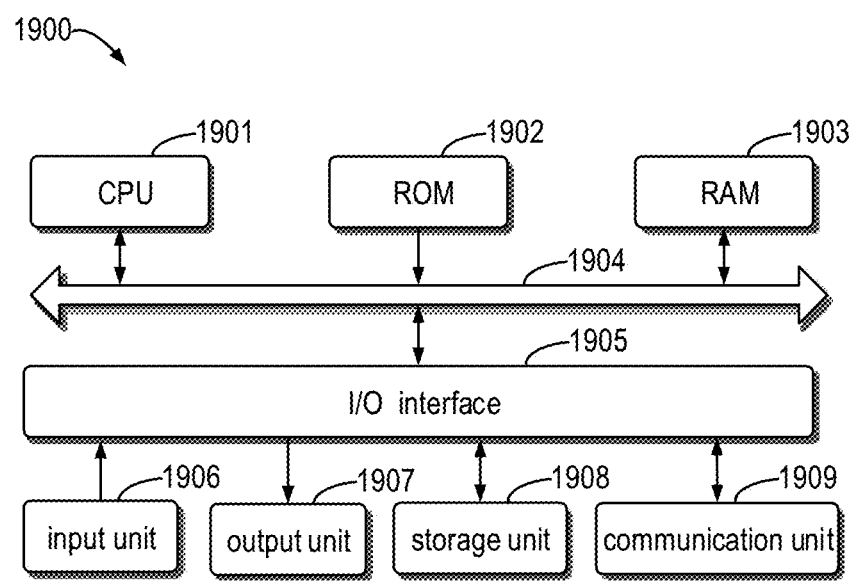
FIG. 19 illustrates a block diagram of an example device that can be used to implement embodiments of the present disclosure.

FIG. 19 illustrates a schematic block diagram of an example device 1900 for implementing embodiments of the present disclosure. For example, the computing device 110 as shown in FIG. 1 may be implemented by the device 1900. As shown therein, the device 1900 includes a central processing unit (CPU) 1901 which performs various appropriate acts and processing, based on computer program instructions stored in a read-only memory (ROM) 1902 or computer program instructions loaded from a storage unit 1908 to a random access memory (RAM) 1903. The RAM 1903 stores therein various programs and data required for operations of the device 1900. The CPU 1901, the ROM 1902 and the RAM 1903 are connected via a bus 1904 with one another. An input/output (I/O) interface 1905 is also connected to the bus 1904.

The following components in the device 1900 are connected to the I/O interface 1905: an input unit 1906 such as a keyboard, a mouse and the like; an output unit 1907 including various kinds of displays and a loudspeaker, etc.; a storage unit 1908 including a magnetic disk, an optical disk, and etc.; a communication unit 1909 including a network card, a modem, and a wireless communication transceiver, etc. The communication unit 1909 allows the device 1900 to exchange information/data with other devices through a computer network such as the Internet and/or various kinds of telecommunications networks. It would be appreciated that, according to the present disclosure, the output unit 1907 may be used to display real-time dynamic change information of customer satisfaction, key factor identification information of group users or individual users participating in the satisfaction, optimization strategy information, strategy implementing effect evaluation information, and the like.

The processing unit 1901 may be executed by one or more processing circuits. The processing unit 1901 may be configured to execute various processes and processing as described above. For example, in some embodiments, the process as described above can be implemented as a computer software program that is tangibly included in a machine readable medium, e.g., the storage unit 1908. In some embodiments, part or all of the computer programs may be loaded and/or mounted onto the device 1900 via ROM 1902 and/or communication unit 1909. When the computer program is loaded to the RAM 1903 and executed by the CPU 1901, one or more steps of the process as described above may be executed.

The present disclosure may be a system, a method and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A data processing method for retail forecasting, the method comprising:
at least one processor configured to implement:
acquiring, by the at least one processor, a time-series dataset from retail sales records, the time-series dataset comprising a plurality of time-series data items each comprising a time and a plurality of corresponding attribute parameters,
wherein the plurality of corresponding attribute parameters comprises at least one of:
a purchase price;
a sales price;
a sales volume;
an inventory;
a sales profit; and
client views;
acquiring, by the at least one processor, a target attribute parameter, which comprises at least the inventory;
determining, by the at least one processor, using a time-series model, at least one influence factor of the target attribute parameter, the at least one influence factor indicating at least one attribute parameter influencing the target attribute parameter and at least one time corresponding to the at least one attribute parameter;
outputting, by the at least one processor, the at least one influence factor;
determining, by the at least one processor, a forecast for the target attribute parameter at a future time using the output at least one influence factor; and
controlling, by the at least one processor, the inventory at the future time in response to the determined forecast for the target attribute parameter,
wherein the at least one influence factor comprises a plurality of influence factors, and the method further comprises:
determining influence of respective influence factors, from among the plurality of influence factors, on the target attribute parameter;
ranking, using the influence of respective influence factors, the plurality of influence factors; and
outputting, using the ranking, part or all of the plurality of influence factors, and
wherein the plurality of influence factors comprise a first influence factor and a second influence factor, the first influence factor has first influence represented as a first interval on the target attribute parameter, the second influence factor has second influence represented as a second interval on the target attribute parameter, and wherein ranking the plurality of influence factors comprises:
in response to determining that an upper limit value of the first interval is less than a lower limit value of the second interval, then determining that the first influence is less than the second influence; or
in response to determining that the first interval and the second interval have an overlapping area, and that a first statistic of the first interval is less than a second statistic of the second interval, then determining that the first influence is less than or equal to the second influence; or
in response to determining that a difference between a lower limit value of the first interval and a lower limit value of the second interval are less than a first threshold, that a difference between an upper limit value of the first interval and an upper limit value of the second interval are less than a second threshold, and that a difference between the first statistic and the second statistic is less than a third threshold, then determining that the first influence is equal to the second influence.

2. The method of claim 1, wherein each of the at least one influence factor influences the target attribute parameter, and the influence is represented in a form of an interval.

3. The method of claim 1, the method further comprising:
determining a change of influence of a first attribute parameter, from among the plurality of corresponding attribute parameters, on the target attribute parameter, over time.

4. The method of claim 3, the method further comprising:
acquiring an indication of the first attribute parameter input by a user.

5. The method of claim 1, the method further comprising:
acquiring a first adjustment indication for a second attribute parameter, from among-in the plurality of corresponding attribute parameters; and
determining, using the first adjustment indication, a relationship between influence of the second attribute parameter on the target attribute parameter and a time.

6. The method of claim 5, wherein the relationship between the influence of the second attribute parameter on the target attribute parameter and the time indicates at least one of:

a change of the influence of the second attribute parameter on the target attribute parameter over time; and a change of accumulative influence of the second attribute parameter on the target attribute parameter over an accumulation of time.

7. The method of claim 6, further comprising:
determining, using the change of the accumulative influence of the second attribute parameter on the target attribute parameter over the accumulation of time, whether the accumulative influence within a preset time period reaches a preset threshold.

8. The method of claim 5, further comprising:
acquiring a second adjustment indication of a third attribute parameter, from among the plurality of corresponding attribute parameters; and
determining, using the first adjustment indication and the second adjustment indication, an attribute parameter having greater influence on the target attribute parameter from the second attribute parameter and the third attribute parameter.

9. The method of claim 5, further comprising:
acquiring the first adjustment indication input by a user.

10. The method of claim 1, further comprising:
acquiring an initial time-series model; and
removing redundant edges by testing the initial time-series model, to thus obtain the time-series model.

11. The method of claim 1, further comprising:
selecting, using a relationship between the time-series dataset and a predetermined dataset, the time-series model from a plurality of candidate models.

12. The method of claim 1, wherein acquiring the time-series dataset comprises:
acquiring an initial time-series dataset;
performing at least one of the following processing on the initial time-series dataset to obtain the time-series dataset;
removing a noise data item; or
generating an augmented data item.

13. The method of claim 12, wherein generating the augmented data item comprises:
inputting a first data item and a second data item from the initial time-series dataset into a data generative model, to obtain the augmented data item, wherein the first data item has a first time, the second data item has a second time, and the augmented data item has a third time.

14. A data processing method for providing reminder information indicating an abnormal risk of a user, the method comprising:
acquiring, by at least one processor, a time-series dataset collected from social media, the time-series dataset comprising a plurality of time-series data items each comprising a time and a plurality of corresponding attribute parameters,
wherein the plurality of corresponding attribute parameters comprises at least one of:
a user identifier;
a user post;
views of the user post;
comments of the user post; and
an abnormal indication comprising an indication of the abnormal risk of the user committing at least one of suicide and an illegal act;
acquiring, by at least one processor, a target attribute parameter comprising at least the abnormal indication;
determining, by the at least one processor, using a time-series model, at least one influence factor of the target attribute parameter, the at least one influence factor indicating at least one attribute parameter influencing the target attribute parameter and at least one time corresponding to the at least one attribute parameter;
determining, by the at least one processor, a forecast for the target attribute parameter at a future time using the determined at least one influence factor; and
controlling, by the at least one processor, output, at the future time, of reminder information indicating the abnormal risk of the user in response to the determined forecast for the target attribute parameter;
wherein the at least one influence factor comprises a plurality of influence factors, and the method further comprises:
determining influence of respective influence factors, from among the plurality of influence factors, on the target attribute parameter;
ranking, using the influence of respective influence factors, the plurality of influence factors; and
outputting, using the ranking, part or all of the plurality of influence factors, and
wherein the plurality of influence factors comprise a first influence factor and a second influence factor, the first influence factor has first influence represented as a first interval on the target attribute parameter, the second influence factor has second influence represented as a second interval on the target attribute parameter, and wherein ranking the plurality of influence factors comprises:
in response to determining that an upper limit value of the first interval is less than a lower limit value of the second interval, then determining that the first influence is less than the second influence; or
in response to determining that the first interval and the second interval have an overlapping area, and that a first statistic of the first interval is less than a second statistic of the second interval, then determining that the first influence is less than or equal to the second influence; or
in response to determining that a difference between a lower limit value of the first interval and a lower limit value of the second interval are less than a first threshold, that a difference between an upper limit value of the first interval and an upper limit value of the second interval are less than a second threshold, and that a difference between the first statistic and the second statistic is less than a third threshold, then determining that the first influence is equal to the second influence.

15. An electronic device for retail forecasting, the device comprising:
a processing circuit configured to:
acquire, by at least one processor, a time-series dataset from retail sales records, the time-series dataset comprising a plurality of time-series data items each comprising a time and a plurality of corresponding attribute parameters,
wherein the plurality of corresponding attribute parameters comprises at least one of:
a purchase price;
a sales price;
a sales volume;
an inventory;
a sales profit; and
client views;
acquire, by the at least one processor, a target attribute parameter comprising at least the inventory;

determine, by the at least one processor, using a time-series model, at least one influence factor of the target attribute parameter, the at least one influence factor indicating at least one attribute parameter influencing the target attribute parameter and at least one time corresponding to the at least one attribute parameter;

output, by the at least one processor, the at least one influence factor;

determine, by the at least one processor, a forecast for the target attribute parameter at a future time using the output at least one influence factor; and control, by the at least one processor, the inventory at the future time in response to the determined forecast for the target attribute parameter, wherein the at least one influence factor comprises a plurality of influence factors, and the processing circuit is further configured to:

determine influence of respective influence factors, from among the plurality of influence factors, on the target attribute parameter;

rank, using the influence of respective influence factors, the plurality of influence factors; and output, using the ranking, part or all of the plurality of influence factors, and wherein the plurality of influence factors comprise a first influence factor and a second influence factor, the first influence factor has first influence represented as a first interval on the target attribute parameter, the second influence factor has second influence represented as a second interval on the target attribute parameter, and wherein ranking the plurality of influence factors comprises:

in response to determining that an upper limit value of the first interval is less than a lower limit value of the second interval, then determining that the first influence is less than the second influence; or in response to determining that the first interval and the second interval have an overlapping area, and that a first statistic of the first interval is less than a second statistic of the second interval, then determining that the first influence is less than or equal to the second influence; or in response to determining that a difference between a lower limit value of the first interval and a lower limit value of the second interval are less than a first threshold, that a difference between an upper limit value of the first interval and an upper limit value of the second interval are less than a second threshold, and that a difference between the first statistic and the second statistic is less than a third threshold, then determining that the first influence is equal to the second influence.

16. The electronic device of claim 15, wherein the processing circuit is further configured to:

determine a change of influence of a first attribute parameter, from among-in the plurality of corresponding attribute parameters, on the target attribute parameter over time.

17. The electronic device of claim 15, further comprising:

acquire a first adjustment indication for a second attribute parameter, from among in the plurality of corresponding attribute parameters; and determine, using the first adjustment indication, a relationship between influence of the second attribute parameter on the target attribute parameter and a time.

18. A data processing method for controlling running time of an Internet of Things (IoT) device, the method comprising:

at least one processor configured to implement:

acquiring, by the at least one processor, a time-series dataset of electricity consumption records, the time-series dataset comprising a plurality of time-series data items each comprising a time and a plurality of corresponding attribute parameters, wherein the plurality of corresponding attribute parameters comprises at least one of:
an electricity price;
an electricity demand;
a voltage;
a current;
a temperature;
a humidity;
an air pressure; and
a power consumption of the IoT device;

acquiring, by the at least one processor, a target attribute parameter, which comprises at least the power consumption of the IoT device;

determining, by the at least one processor, using a time-series model, at least one influence factor of the target attribute parameter, the at least one influence factor indicating at least one attribute parameter influencing the target attribute parameter and at least one time corresponding to the at least one attribute parameter;

outputting, by the at least one processor, the at least one influence factor;

determining, by the at least one processor, a forecast for the target attribute parameter at a future time using the output at least one influence factor; and controlling, by the at least one processor, running time of the IoT device in response to the output determined forecast for the target attribute parameter, wherein the at least one influence factor comprises a plurality of influence factors, and the method further comprises:

determining influence of respective influence factors, from among the plurality of influence factors, on the target attribute parameter;

ranking, using the influence of respective influence factors, the plurality of influence factors; and outputting, using the ranking, part or all of the plurality of influence factors, and wherein the plurality of influence factors comprise a first influence factor and a second influence factor, the first influence factor has first influence represented as a first interval on the target attribute parameter, the second influence factor has second influence represented as a second interval on the target attribute parameter, and wherein ranking the plurality of influence factors comprises:

in response to determining that an upper limit value of the first interval is less than a lower limit value of the second interval, then determining that the first influence is less than the second influence; or in response to determining that the first interval and the second interval have an overlapping area, and that a first statistic of the first interval is less than a second statistic of the second interval, then determining that the first influence is less than or equal to the second influence; or in response to determining that a difference between a lower limit value of the first interval and a lower limit value of the second interval are less than a first threshold, that a difference between an upper limit value of the first interval and an upper limit value of the second interval are less than a second threshold, and that a difference between the first statistic and the second statistic is less than a third threshold, then determining that the first influence is equal to the second influence.

* * * * *